(12) United States Patent
Kosaka et al.

(10) Patent No.: US 10,889,700 B2
(45) Date of Patent: Jan. 12, 2021

(54) INORGANIC NANOFIBER AND METHOD FOR MANUFACTURING SAME

(71) Applicant: JAPAN VILENE COMPANY, LTD., Tokyo (JP)

(72) Inventors: Yusuke Kosaka, Ibaraki (JP); Takashi Tarao, Ibaraki (JP)

(73) Assignee: JAPAN VILENE COMPANY, LTD., Tokyo (JP)

( * ) Notice: Subject to any disclaimer, the term of this patent is extended or adjusted under 35 U.S.C. 154(b) by 20 days.

(21) Appl. No.: 16/460,599

(22) Filed: Jul. 2, 2019

(65) Prior Publication Data

US 2019/0322840 A1 Oct. 24, 2019

Related U.S. Application Data

(60) Continuation of application No. 15/584,645, filed on May 2, 2017, now Pat. No. 10,385,188, which is a (Continued)

(30) Foreign Application Priority Data

| Mar. 12, 2013 | (JP) | ................................ | 2013049634 |
| Sep. 18, 2013 | (JP) | ................................ | 2013193080 |
| Oct. 29, 2013 | (JP) | ................................ | 2013224670 |

(51) Int. Cl.
*D01F 9/08* (2006.01)
*C04B 35/622* (2006.01)
(Continued)

(52) U.S. Cl.
CPC ................ *C08K 7/08* (2013.01); *B32B 18/00* (2013.01); *C04B 35/624* (2013.01); (Continued)

(58) Field of Classification Search
CPC ............ D01D 5/0007; C04B 35/62236; C04B 35/6224; C04B 35/6225; C04B 35/624; D01F 9/08; D10B 2101/02; D10B 2101/08
See application file for complete search history.

(56) References Cited

U.S. PATENT DOCUMENTS 3,793,041 A * 2/1974 Sowman ............. C04B 35/6225
501/103
7,572,424 B1   8/2009 Sokolov et al.
(Continued)

FOREIGN PATENT DOCUMENTS

CN      101381225 A      3/2009
EP       1887112 A1 *   2/2008   ....... C04B 35/62236
(Continued)

OTHER PUBLICATIONS

Machine translated English language equivalent of JP 2004183132 (2004, 10 pages).*
(Continued)

*Primary Examiner* — Brieann R Johnston
(74) *Attorney, Agent, or Firm* — Heslin Rothenberg Farley & Mesiti P.C.

(57) ABSTRACT

Disclosed are an inorganic nanofiber characterized in that the average fiber diameter is 2 μm or less, the average fiber length is 200 μm or less, and the CV value of the fiber length is 0.7 or less; and a method of manufacturing the same. In the manufacturing method, an inorganic nanofiber sheet consisting of inorganic nanofibers having an average fiber diameter of 2 μm or less is formed by electrospinning, and then, the inorganic nanofiber sheet is pressed using a press machine and crushed so that the average fiber length becomes 200 μm or less, and the CV value of the fiber length becomes 0.7 or less.

1 Claim, 2 Drawing Sheets

Related U.S. Application Data division of application No. 14/774,324, filed as application No. PCT/JP2014/052791 on Feb. 6, 2014, now abandoned.

(51) Int. Cl.

| | | |
|---|---|---|
| *C04B 35/624* | (2006.01) | |
| *D01D 1/02* | (2006.01) | |
| *D01D 5/00* | (2006.01) | |
| *C08K 7/08* | (2006.01) | |
| *B32B 18/00* | (2006.01) | |
| *C08K 3/22* | (2006.01) | |

(52) U.S. Cl.
CPC ...... *C04B 35/6224* (2013.01); *C04B 35/6225* (2013.01); *C04B 35/62231* (2013.01); *C04B 35/62236* (2013.01); *C08K 3/22* (2013.01); *D01D 1/02* (2013.01); *D01D 5/0007* (2013.01); *D01F 9/08* (2013.01); *C04B 2235/44* (2013.01); *C04B 2235/441* (2013.01); *C04B 2235/526* (2013.01); *C04B 2235/5264* (2013.01); *C04B 2235/5268* (2013.01); *C04B 2237/38* (2013.01); *C08K 2003/2227* (2013.01); *D10B 2101/02* (2013.01)

(56) References Cited

U.S. PATENT DOCUMENTS

| | | |
|---|---|---|
| 2002/0012783 A1 | 1/2002 | Hikichi et al. |
| 2003/0005723 A1 | 1/2003 | Kawabe et al. |
| 2008/0206541 A1 | 8/2008 | Medoff |
| 2010/0207054 A1 | 8/2010 | Ohshima et al. |
| 2011/0266213 A1* | 11/2011 | Jo ................... C04B 35/62813 210/496 |
| 2016/0053090 A1 | 2/2016 | Kosaka et al. |
| 2016/0177476 A1 | 6/2016 | Ban et al. |
| 2016/0194461 A1 | 7/2016 | Suzuki et al. |
| 2017/0240726 A1 | 8/2017 | Kosaka et al. |

FOREIGN PATENT DOCUMENTS

| | | | | |
|---|---|---|---|---|
| EP | 1887112 A1 | 2/2008 | | |
| JP | 59-6186 B2 | 2/1984 | | |
| JP | 04-002879 A | 1/1992 | | |
| JP | 08283456 A | 10/1996 | | |
| JP | 08319199 A * | 12/1996 | | |
| JP | 2003-073964 A | 3/2003 | | |
| JP | 2004-183132 A | 2/2004 | | |
| JP | 2004183132 A * | 7/2004 | ........... C03B 37/011 |
| JP | 2012-127039 A | 7/2012 | | |
| JP | 2012-153582 A | 8/2012 | | |
| JP | 2014-034739 A | 2/2014 | | |
| WO | 2007024186 A2 | 3/2007 | | |
| WO | WO-2007109304 A2 * | 9/2007 | ....... C04B 35/62259 |
| WO | 2009/048000 A1 | 4/2009 | | |
| WO | WO-2012006416 A2 * | 1/2012 | ........... C01G 23/003 |

OTHER PUBLICATIONS

Google Patents translation of JP 08319199 (1996, 4 pages).*
English Translation of International Search Report for PCT/JP2014/052791 dated Apr. 15, 2014.
Extended European Search Report for EP 14764692.1 dated Sep. 15, 2016.
Yuh, J., et al., "Sol-gel based synthesis of complex oxide nanofibers", J. Sol-Gel Sci Techn, vol. 42, pp. 323-329 (2007).

* cited by examiner

INORGANIC NANOFIBER AND METHOD FOR MANUFACTURING SAME

CROSS-REFERENCE TO RELATED APPLICATIONS

This application is a continuation application of U.S. patent application Ser. No. 15/584,645, filed with the U.S. Patent and Trademark Office on May 2, 2017, which is a divisional application of U.S. patent application Ser. No. 14/774,324, filed with the U.S. Patent and Trademark Office on Sep. 10, 2015, which is a National Stage Entry under Section 371 of International Application No. PCT/JP2014/052791, filed on Feb. 6, 2014, which claims priority to Japanese Application Nos. 2013-224670 (filed on Oct. 29, 2013), 2013-193080 (filed on Sep. 18, 2013), and 2013-049634 (filed on Mar. 12, 2013). The entire contents of each of the prior applications are hereby incorporated herein by reference.

TECHNICAL FIELD

The present invention relates to an inorganic nanofiber, and a method of manufacturing the same. The inorganic nanofiber of the present invention may be suitably used as materials which constitute, for example, a filler, a catalyst carrier, a structural material, an electrode material, a filter material, or the like. According to the manufacturing method of the present invention, an inorganic mixed nanofiber, which may be suitably used as a filler for a transparent resin sheet, can be easily produced, since it is easy to adjust the refractive index.

BACKGROUND ART

A filler is added, for example, in order to improve mechanical properties such as strength, or thermal properties of a polymer film. In the recent trend of miniaturization of electrical equipment, there is a thinning trend in the field of polymer films. The thinner a polymer film is, the finer and shorter a filler added to the polymer film must be. This is because if the filler is thicker or longer than the thickness of the polymer film, the filler is likely to protrude from the polymer film, and therefore, many practical problems arise.

As an inorganic short fiber applicable to such a filler, the applicant of the present application has proposed "an inorganic short fiber, which is mainly composed of an inorganic component, wherein the average fiber diameter is 2 μm or less, the average fiber length is 20 mm or less, and the ratio (Ld/La) of the standard deviation (Ld) of the fiber length to the average fiber length (La) of the inorganic short fiber is 0.3 or less." (Patent literature 1). The average fiber diameter of the inorganic short fiber is small, and thus, it was considered to be applicable to a thin-film polymer film. Although this document exemplifies conventional fiber cutting machines, such as a guillotine-type cutting machine and a rotary cutter-type cutting machine, as a method of manufacturing the inorganic short fiber, even if these conventional fiber cutting machines were used, it was extremely difficult to obtain inorganic short fibers having a short fiber length of 200 μm or less, as described in the Examples of the document, due to the mechanism of the machines, and it was difficult to use the fibers as a filler for thinner polymer films. In addition, since these cutting machines use a metal blade, there was a problem wherein the metal blade was damaged at the time of cutting, and a piece of metal was mixed in with inorganic short fibers or an inorganic fiber aggregate. This problem was remarkable in the case of manufacturing short fibers consisting of a hard inorganic material such as alumina, which was also used as an abrasive.

A ball mill, a mortar, and the like are known as devices for crushing fibers. However, even if these crushing devices were used, fibers could not be sufficiently crushed to obtain fine fibers having an average fiber diameter of 2 μm or less, or even if fibers could be crushed, short fibers in which the fiber length were uniform could not be prepared.

On the other hand, a filler is added in order to improve mechanical properties such as impact resistance and tensile strength, or thermal properties such as thermal extension suppression of a transparent resin sheet. In such a filler, in addition to imparting these properties, it is necessary to not impair the transparency of the transparent resin sheet. Therefore, the refractive index of the filler is adjusted to the refractive index of the transparent resin sheet.

For example, "a filler for polycarbonate resin consisting of a glass component, wherein silicon dioxide ($SiO_2$), aluminum oxide ($Al_2O_3$), and titanium oxide ($TiO_2$) are contained as essential components; at least one of lithium oxide ($Li_2O$), sodium oxide ($Na_2O$), and potassium oxide ($K_2O$) is contained; and the contents of the components, as represented by mass %, are $45 \leq SiO_2 \leq 65$, $0.1 \leq Al_2O_3 \leq 15$, $9 \leq (Li_2O+Na_2O+K_2O) \leq 25$, and $15 \leq TiO_2 \leq 25$." (Patent literature 2) has been proposed. However, this filler could not be applied to resins other than polycarbonate resins. In addition to this problem, it was considered that the adjusting of the refractive index was difficult, because it contained at least four components.

In connection with this, the applicant of the present application did not intend to adjust the refractive index, but disclosed that a silica stock solution and an alumina stock solution were mixed to prepare a sol solution, the sol solution was fiberized by electrospinning, and the fibers were dried and sintered to produce an inorganic structure consisting of silica-alumina sintered ultrafine long fibers (Patent literature 3). It was examined whether or not the refractive index could be controlled utilizing this technique, but the fine adjustment of the refractive index was difficult, and it was difficult to obtain silica-alumina sintered ultrafine long fibers having a uniform refractive index.

CITATION LIST

Patent Literature

[Patent literature 1] Japanese Unexamined Patent Publication (Kokai) No. 2004-183132
[Patent literature 2] Japanese Unexamined Patent Publication (Kokai) No. 2012-153582
[Patent literature 3] Japanese Unexamined Patent Publication (Kokai) No. 2003-73964

SUMMARY OF INVENTION

Technical Problem

The present invention has been made under these circumstances, the first object is to provide an inorganic nanofiber, despite the fact that it is a fine fiber of which the average fiber diameter is 2 μm or less, wherein the average fiber length is 200 μm or less and the fiber length is uniform, which was conventionally difficult to be obtained, and a method of manufacturing the same.

The second object is to provide a filler-dispersed organic resin composite, in which the inorganic nanofibers are dispersed as an inorganic fibrous filler.

The third object is to provide a method of manufacturing an inorganic mixed nanofiber, capable of easily producing an inorganic mixed nanofiber which matches with the refractive index of each of the various resin sheets.

Solution to Problem

[1] The present invention relates to "an inorganic nanofiber characterized in that an average fiber diameter is 2 μm or less, an average fiber length is 200 μm or less, and a CV value of a fiber length is 0.7 or less".

[2] The present invention relates to "the inorganic nanofiber of [1], characterized in that a rate of change in fiber length (Lr) calculated from the following equation (1) is 30% or less:

$$Lr=[(Lb-La)/Lb]\times 100 \tag{1}$$

wherein Lb is an average fiber length of the inorganic nanofiber, and La is an average fiber length after applying a pressure of 10 MPa to the inorganic nanofiber".

[3] The present invention relates to "a filler-dispersed organic resin composite, characterized in that the inorganic nanofiber of [1] or [2] is dispersed as an inorganic fibrous filler in an organic resin".

[4] The present invention relates to "the filler-dispersed organic resin composite of [3], characterized in that the inorganic nanofiber is an alumina fiber, and a thermal conductivity is 3 W/m·K or more at a thickness of 0.3 mm".

[5] The present invention relates to "a method of manufacturing an inorganic nanofiber, characterized by comprising:

forming an inorganic nanofiber sheet consisting of inorganic nanofibers having an average fiber diameter of 2 μm or less by electrospinning, and pressing the inorganic nanofiber sheet using a press machine, and crushing it so that the average fiber length becomes 200 μm or less, and the CV value of the fiber length becomes 0.7 or less".

[6] The present invention relates to "a method of manufacturing an inorganic mixed nanofiber, characterized by comprising:

mixing a first spinnable sol solution, which is a material for a first inorganic oxide, with a second spinnable sol solution or a metal salt solution, which is a material for a second inorganic oxide having a refractive index different from that of the first inorganic oxide, to prepare a spinnable mixed sol solution, forming an inorganic mixed nanofiber sheet consisting of inorganic mixed nanofibers having an average fiber diameter of 2 μm or less from the spinnable mixed sol solution by electrospinning, and pressing the inorganic nanofiber sheet using a press machine, and crushing it so that the average fiber length becomes 200 μm or less, and the CV value of the fiber length becomes 0.7 or less, wherein a potential hydrogen of the first spinnable sol solution is matched with that of the second spinnable sol solution or the metal salt solution, and the preparation of the spinnable mixed sol solution is carried out without being gelled".

Advantageous Effects of Invention

The invention of [1] is an inorganic nanofiber, in which the average fiber diameter is 2 μm or less, which is thin, and despite the fact that the average fiber length is 200 μm or less, which could not be obtained by a conventional cutting machine, the CV value of the fiber length is 0.7 or less, i.e., the fiber length is uniform. Therefore, a composite having thin and uniform properties can be formed. For example, even when the inorganic nanofiber is used as a filler for a thin-film polymer film, since it is unlikely to protrude from the surface of the polymer film, it is easy to produce a polymer film composite which is practically problem-free.

The invention of [2] is an inorganic nanofiber having a rate of change in fiber length of 30% or less, in which it is not easily deformed by pressure or a shearing force, and the mechanical strength is good. Therefore, a composite having a good mechanical strength and a good form stability against a temperature change can be produced.

The invention of [3] may be a composite having thin and uniform properties, because the inorganic nanofibers are dispersed as a filler.

The invention of [4] is a composite having a good thermal conductivity, which is 3 W/m·K or more at a thickness of 0.3 mm.

According to the invention of [5], an inorganic nanofiber sheet having an average fiber diameter of 2 μm or less, which is thin, and having a small average pore size and a uniform pore size, can be formed by electrospinning. The fact that the average pore size is small and the pore size is uniform means that the distances between the intersections of the inorganic nanofibers are short and uniform. Therefore, when pressure is applied to the inorganic nanofiber sheet in such a state using a press machine so that the orientation of the inorganic nanofibers is not changed, the intersections of the inorganic nanofibers are highly pressed, and the intersections are likely to be broken, because the inorganic nanofiber has a high rigidity and is not easily deformed, and therefore, the inorganic nanofibers in which the fiber length is short and uniform can be produced. That is, the inorganic nanofiber of [1] can be produced.

In the invention of [6], the inventors found that the first spinnable sol solution, and the second spinnable sol solution or metal salt solution (respectively, as materials of the first inorganic oxide and the second inorganic oxide, of which the refractive index is different), are mixed without being gelled, so that the potential hydrogen is matched with one another in accordance with the refractive index of the first and second inorganic oxides, to prepare a spinnable mixed sol solution, and the inorganic mixed nanofibers having a desired refractive index can be easily produced by electrospinning of the spinnable mixed sol solution.

DESCRIPTION OF EMBODIMENTS

<Inorganic Nanofiber>

Figure 1:
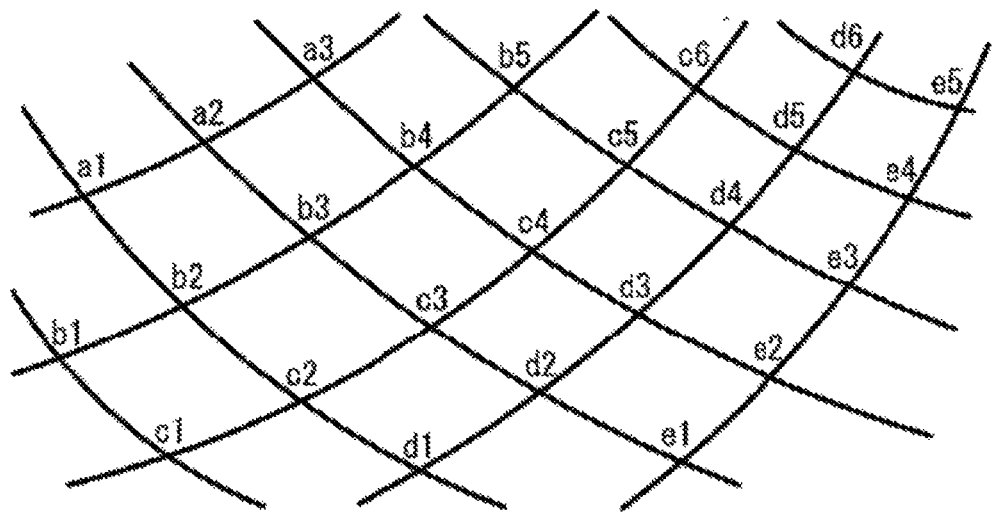
FIG. 1 is a plain view schematically showing the state of arrangement of inorganic nanofibers in an inorganic nanofiber sheet formed by electrospinning.

The inorganic nanofiber of the present invention has an average fiber diameter of 2 μm or less, an average fiber length of 200 μm or less, and a CV value of a fiber length of 0.7 or less. Therefore, when the inorganic nanofiber of the present invention is used, a composite having thin and uniform properties can be formed. For example, even when the inorganic nanofiber is used as a filler for a thin-film polymer film, since it is unlikely to protrude from the surface of the polymer film, it is easy to produce a polymer film composite which is practically problem-free.

The average fiber diameter of the inorganic nanofiber of the present invention is 2 μm or less. The average fiber diameter is preferably 1 μm or less, more preferably 0.9 μm or less, and still more preferably 0.8 μm or less, because the smaller the average fiber diameter is, the thinner and more uniform a composite can be, and it is possible to cope with the recent miniaturization, for example, a polymer film which is more thinned out. The lower limit of the average fiber diameter is not particularly limited, approximately 0.01 μm is suitable, and 0.05 μm or more is preferable. The "average fiber diameter" as used herein means an arithmetic mean value of fiber diameters measured at 50 points of fibers, and the "fiber diameter" means a length in a direction perpendicular to the length direction of a fiber, measured on the basis of electron micrographs (5000 times) depicting fibers.

The inorganic nanofiber of the present invention has an average fiber length of 200 μm or less, which could not be obtained by a conventional fiber cutting machine, and therefore, a composite having thin and uniform properties can be formed. For example, even when it is used as a filler for a thin-film polymer film having a thickness of 200 μm or less (particularly 100 μm or less, and more particularly less than 100 μm), which was conventionally difficult, since the filler is unlikely to protrude from the polymer film, it can be easily used without any practical problem. Since the average fiber length of the inorganic nanofiber varies depending on its use, it is not particularly limited, but may be 150 μm or less, 100 μm or less, less than 100 μm, 95 μm or less, 90 μm or less, 85 μm or less, or 80 μm or less. The lower limit of the average fiber length of the inorganic nanofiber is not particularly limited, though 0.1 μm is suitable. The "average fiber length" as used herein means an arithmetic mean value of fiber lengths measured at 50 fibers, and the "fiber length" means a length in the length direction of a fiber, measured on the basis of an electron micrograph (500 to 5000 times) depicting fibers.

The inorganic nanofiber of the present invention has the above-mentioned average fiber length. Since the CV value of the fiber length is 0.7 or less, that is, the fiber lengths are uniform, the quality is consistent. As a result, a composite having thin and uniform properties can be formed. For example, even when it is used as a filler for a thin-film polymer film, a polymer film with a stable quality can be produced. Since the smaller the CV value of the fiber length is, the more uniform it is, the CV value of the fiber length is preferably 0.6 or less, more preferably 0.5 or less, still more preferably 0.4 or less, still more preferably 0.3 or less, still more preferably 0.2 or less, and ideally 0. The "CV value of a fiber length" is a value obtained by dividing the standard deviation of the fiber length by the average fiber length, i.e., (the standard deviation of the fiber length)/(average fiber length). The "standard deviation" is a value calculated from the fiber lengths of 50 fibers at the measurement of the average fiber length.

The aspect ratio of the inorganic nanofiber of the present invention is preferably 1000 or less. This is because when it is dispersed in an organic resin, it resists aggregation, and can uniformly disperse throughout the organic resin. The aspect ratio is preferably 750 or less, more preferably 500 or less, still more preferably 300 or less, still more preferably 200 or less, still more preferably 100 or less, still more preferably less than 100, still more preferably 90 or less, and still more preferably 80 or less.

The aspect ratio of the inorganic nanofiber is preferably 5 or more. This is because when the aspect ratio is 5 or more, the fiber length is longer than the fiber diameter, and therefore, a formed composite exhibits, even with a small amount, a good mechanical strength and a good form stability against temperature change. The aspect ratio is preferably 10 or more, more preferably 20 or more, still more preferably 30 or more, and still more preferably 40 or more. The "aspect ratio" is a ratio of the average fiber diameter of the inorganic nanofiber to the average fiber length, and a value obtained by dividing the average fiber length of the inorganic nanofiber by the average fiber diameter.

The rate of change in fiber length of the inorganic nanofiber of the present invention is preferably 30% or less. As will be understood from the equation described below, the fact that the rate of change in fiber length is small means that the average fiber length is unlikely to be changed even when pressure is applied, that is, the inorganic nanofiber is unlikely to be destroyed. Therefore, the inorganic nanofiber per se exhibits a good mechanical strength, and as a result, a composite in which the inorganic nanofiber is used as an inorganic fibrous filler exhibits a good mechanical strength. For example, since an alumina nanofiber exhibits a good mechanical strength, it is unlikely to be destroyed by pressure or a shearing force applied during formation, and therefore, a composite which can secure percolation and exhibits high thermal conductivity can be made. Since the smaller the rate of change in fiber length is, the better the mechanical strength of the inorganic nanofiber per se is, the rate of change in fiber length is preferably 20% or less, more preferably 15% or less, still more preferably 10% or less, still more preferably 5% or less, still more preferably 4% or less, still more preferably 3% or less, still more preferably 2% or less, and still more preferably 1% or less.

The rate of change in fiber length (Lr) is a value calculated from the following Equation (1):

$$Lr=[(Lb-La)/Lb]\times 100 \qquad (1)$$

wherein Lb is the average fiber length of the inorganic nanofiber, and La is the average fiber length after applying a pressure of 10 MPa to the inorganic nanofiber. With respect to the pressurization for the inorganic nanofiber, approximately 1 g of the inorganic nanofiber is weighed, and a pressure of 10 MPa is applied to the inorganic nanofiber using a press machine at room temperature for 3 seconds.

Examples of the state of the inorganic nanofiber include an inorganic gel fiber, an inorganic dried gel fiber, and an inorganic sintered fiber. The inorganic gel fiber is a fiber in a state where it contains a solvent. The inorganic dried gel fiber is a porous fiber from which a solvent or the like which was contained in the inorganic gel fiber is removed. The inorganic sintered fiber is a fiber obtained by sintering the inorganic dried gel fiber. Among these inorganic nanofibers, the inorganic sintered fiber exhibits a good rigidity and strength, and therefore, it can be applied to various uses. In particular, it can improve the mechanical strength of a composite, and when it is a sintered alumina nanofiber, it can improve the mechanical properties and the thermal conductivity of a composite.

The inorganic component of the inorganic nanofiber is not particularly limited, but it may be an oxide of the elements exemplified below:

(elements) lithium, beryllium, boron, sodium, magnesium, aluminum, silicon, phosphorus, sulfur, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, cadmium, indium, tin, antimony, tellurium, cesium, barium, lanthanum, hafnium, tantalum, tungsten, mercury, thallium, lead, bismuth, cerium, praseodymium, neodymium, promethium, samarium, europium, gadolinium, terbium, dysprosium, holmium, erbium, thulium, ytterbium, lutetium, or the like.

More particularly, examples of the oxide include $SiO_2$, $Al_2O_3$, $B_2O_3$, $TiO_2$, $ZrO_2$, $CeO_2$, $FeO$, $Fe_3O_4$, $Fe_2O_3$, $VO_2$, $V_2O_5$, $SnO_2$, $CdO$, $LiO_2$, $WO_3$, $Nb_2O_5$, $Ta_2O_5$, $In_2O_3$, $GeO_2$, $PbTi_4O_9$, $LiNbO_3$, $BaTiO_3$, $PbZrO_3$, $KTaO_3$, $Li_2B_4O_7$, $NiFe_2O_4$, $SrTiO_3$, and the like. The inorganic component may be composed of one component of oxide, or two or more components of oxides, for example, two components of $SiO_2$—$Al_2O_3$.

When the inorganic nanofiber is used as a filler for a composite, it is preferable that the surface of the inorganic nanofiber is modified with a surface treatment agent, such as a silane coupling agent, in order to enhance the affinity between the inorganic nanofiber and an organic resin.

<Manufacturing Method of Inorganic Nanofiber>

The inorganic nanofiber of the present invention may be produced by forming an inorganic nanofiber sheet consisting of inorganic nanofibers having an average fiber diameter of 2 μm or less by electrospinning; and pressing the inorganic nanofiber sheet using a press machine, and crushing it so that the average fiber length becomes 200 μm or less, and the CV value of the fiber length becomes 0.7 or less. An inorganic nanofiber with a rate of change in fiber length of 30% or less and a good mechanical strength may be produced by electrospinning a spinnable sol. This is because inorganic fibers with a few interfaces between the inorganic components can be spun by spinning the spinning sol solution.

More particularly, the inorganic nanofiber sheet consisting of inorganic nanofibers having an average fiber diameter of 2 μm or less is formed by electrospinning. Electrospinning can provide an inorganic nanofiber in which the diameter is small as an average fiber diameter of 2 μm or less, the average pore size is small, and the pore size is uniform. The fact that the average pore size is small and the pore size is uniform means that the distances between the intersections of the inorganic nanofibers are short and uniform.

With respect to this point, it will be explained on the basis of FIG. 1, which is a plain view schematically showing the state of arrangement of inorganic nanofibers in an inorganic nanofiber sheet formed by electrospinning, and FIG. 2, which is a plain view schematically showing the state of arrangement of inorganic nanofibers in an inorganic nanofiber sheet formed by a method other than electrospinning. As shown in FIG. 1, since an inorganic nanofiber sheet in which the average pore size is small and the pore size is uniform can be formed by electrospinning, the distances between the intersections of the inorganic nanofibers are short and uniform. For example, when attention is paid to c5, which is an intersection of fibers, the distances between c5 and fiber intersections b5, c4, c6, and d4, which are adjacent to c5, are relatively short and nearly the same.

Figure 2:
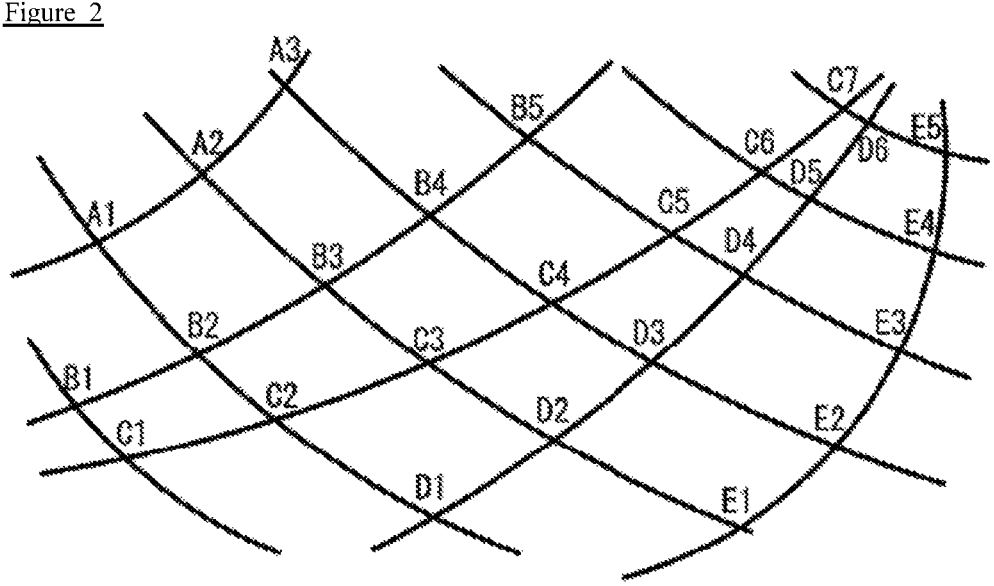
FIG. 2 is a plain view schematically showing the state of arrangement of inorganic nanofibers in an inorganic nanofiber sheet formed by a method other than electrospinning.

On the other hand, as shown in FIG. 2, the variation in pore size is large in the inorganic nanofiber sheet formed by a method other than electrospinning. For example, when attention is paid to C5, which is an intersection of fibers, the distances between C5 and fiber intersections B5, C4, C6, and D4, which are adjacent to C5, vary widely.

Electrospinning is a method in which a spinning solution is drawn to form fibers by applying an electric field to the spinning solution. Electrospinning will be briefly explained on the basis of FIG. 3, which is a schematic cross-sectional view of an apparatus for electrospinning disclosed in JP 2005-194675.

Figure 3:
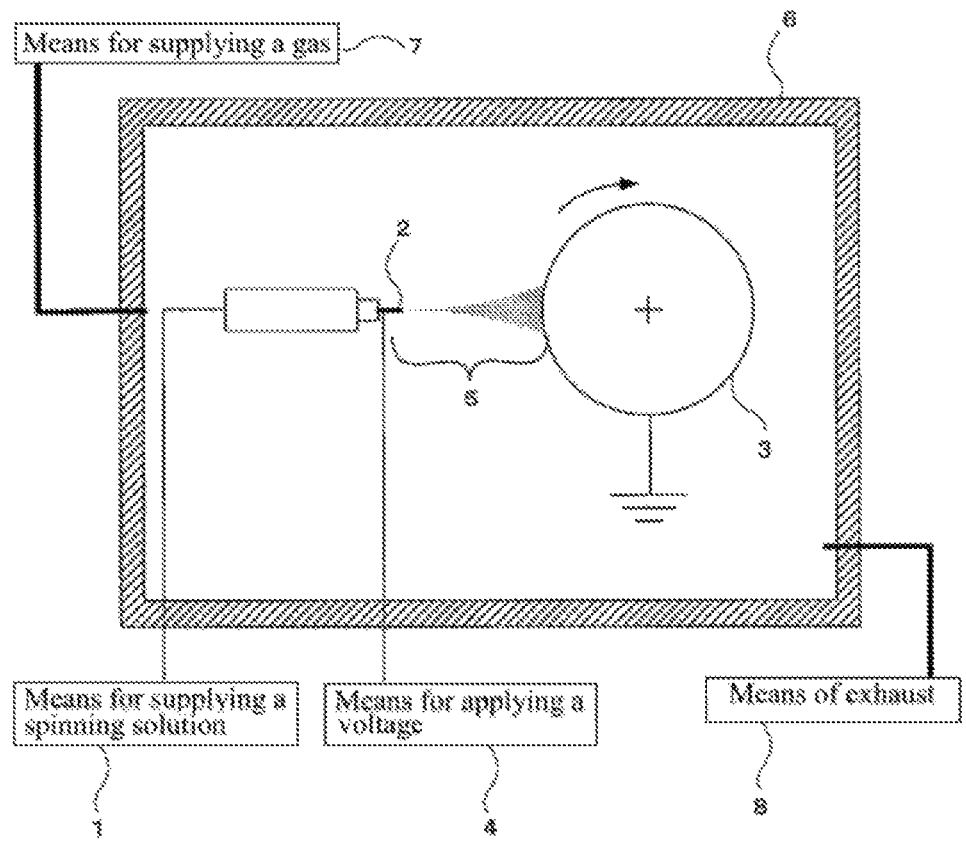
FIG. 3 is a schematic cross-sectional view of an apparatus for electrospinning.

The apparatus shown in FIG. 3 comprises a means for supplying a spinning solution 1 capable of supplying a spinning solution to a nozzle 2; the nozzle 2 capable of extruding the spinning solution supplied by the means for supplying a spinning solution 1; a grounded support 3 for capturing inorganic nanofibers generated by extruding the solution from the nozzle 2 and drawing it by an electric field; a means for applying a voltage 4 capable of applying a voltage to the nozzle 2 to generate an electric field between the nozzle 2 and the grounded support 3; a spinning box 6 containing the nozzle 2 and the support 3; a means for supplying a gas 7 capable of supplying a gas having a predetermined relative humidity to the spinning box 6; and a means of exhaust 8 capable of exhausting a gas from the spinning box 6.

In this apparatus, the spinning solution is supplied to the nozzle 2 by the means for supplying a spinning solution 1. The supplied spinning solution is extruded from the nozzle 2, and at the same time, drawn by an action of the electric field between the grounded support 3 and the nozzle 2 applied by the means for applying a voltage 4, and spun toward the support 3 while being fiberized. The spun inorganic nanofibers are directly accumulated on the support 3 to form an inorganic nanofiber sheet.

As for the spinning solution, an inorganic sol solution is preferable, because inorganic nanofibers can be spun. This inorganic sol solution may be obtained by hydrolysis and polycondensation of a solution (material solution) containing a compound including an element which constitutes the inorganic nanofibers finally obtained at a temperature of 100° C. or less. The solvent of the material solution may be an organic solvent, such as alcohol, and/or water.

As described above, the spinning solution is preferably spinnable. The property "spinnable" is judged on the basis of the criteria described below after carrying out electrospinning under the following conditions.

(Method for Judgment)

A solution (solid content: 10 to 50 mass %) to be judged is extruded (amount extruded: 0.5 to 1.0 g/hr) to a grounded metal plate from a metal nozzle (inner diameter: 0.4 mm) which is arranged in a horizontal direction, and at the same time, a voltage is applied (electric field intensity: 1 to 3 kV/cm, polarity: application of positive voltage or negative voltage) to the nozzle, to continuously spin fibers for a minute or more without solidification of the solution at the tip of the nozzle, and the fibers accumulate on the metal plate (aluminum plate).

A scanning electron micrograph of the accumulated fibers is taken and observed. When conditions where fibers having an average fiber diameter (an arithmetic mean value of fiber diameters measured at 50 points) of 5 μm or less and an aspect ratio of 100 or more can be produced without droplets can be found, it is judged that the solution is "spinnable". By contrast, even if one or more of the above conditions (i.e., the concentration, amount extruded, electric field intensity, and/or polarity) are changed and combined in any combination thereof, when the above conditions cannot be found [a case where there are droplets, a case where each fiber is oily and does not have a definite fibrous shape, a case where the average fiber diameter is more than 5 μm, or a case where the aspect ratio is less than 100 (for example, particles)], it is judged that the solution is "not spinnable".

The element which constitutes the inorganic nanofiber finally obtained may be an element which constitutes an inorganic component of the inorganic nanofiber, as described above, and the compound may be one component or two or more components of the oxides including the elements, as described above.

The viscosity of the inorganic sol solution is preferably 0.01 to 10 Pa·s, more preferably 0.05 to 5 Pa·s, and still more preferably 0.1 to 3 Pa·s, because electrospinning can be carried out. When the viscosity is higher than 10 Pa·s, it is difficult to produce inorganic nanofibers having an average fiber diameter of 2 μm or less. When the viscosity is lower than 0.01 Pa·s, there is a tendency that a fibrous form per se cannot be obtained. In connection with this, when a nozzle is used and the atmosphere at the nozzle tip portion is the same solvent gas atmosphere as the solvent of a material solution, even if the viscosity of the inorganic sol solution is higher than 10 Pa·s, there is a case wherein fibers can be spun.

The inorganic sol solution can contain an organic component in addition to the inorganic component as described above. Examples of the organic component include a silane coupling agent, an organic low-molecular compound such as a dye, and an organic high-molecular compound such as polymethyl methacrylate. More particularly, when the compound contained in the material solution is a silane compound, it can contain a compound obtained by polycondensating a silane compound organically modified with a methyl group or an epoxy group.

The material solution can contain a solvent which stabilizes a compound contained in the material solution [for example, an organic solvent (for example, alcohols such as ethanol, or dimethyl formamide) or water], water for the hydrolysis of a compound contained in the material solution, and a catalyst which smoothly progresses the hydrolysis reaction (for example, an acid catalyst, such as hydrochloric acid or nitric acid; a base catalyst, such as tetrabutylammonium hydroxide; or a salt catalyst, such as hydrazinium chloride).

The material solution can contain, for example, a chelating agent which stabilizes a compound, a silane coupling agent to stabilize the compound, a compound capable of imparting various functions such as piezoelectricity, an organic compound to adjust transparency, adhesion improvement, flexibility, or hardness (friability) (for example, polymethyl methacrylate), an inorganic component with cell affinity, such as hydroxyapatite, or an additive, such as a dye. These additives can be added, before the hydrolysis, during the hydrolysis, or after the hydrolysis.

The material solution can contain inorganic or organic microparticles. Examples of the inorganic microparticles include titanium oxide, manganese dioxide, copper oxide, silicon dioxide, activated carbon, and a metal (for example, platinum). Examples of the organic microparticles include a dye and a pigment. The average particle size of the microparticle is not particularly limited, but it is preferably 0.001 to 1 m, and more preferably 0.002 to 0.1 m. These microparticles can impart an optical function, porosity, cell affinity, a catalytic function, a protein adsorption function, an ion exchange function, or the like.

The amount of water for the hydrolysis of the compound contained in the material solution varies according to the materials, and is not particularly limited. For example, when the compound is tetraethoxysilane, since it becomes difficult to obtain a spinnable sol solution when the amount of water exceeds four times (molar ratio) that of alkoxide, four times or less that of alkoxide is preferable. Similarly, when the compound is aluminum sec-butoxide, the amount of water is preferably four times or less that of alkoxide so that a spinnable sol solution can be obtained.

The reaction temperature is not particularly limited, so long as it is lower than the boiling point of the solvent used, but when the temperature is low, the reaction rate is appropriately slow, and it is easy to form a spinnable sol solution. When the temperature is too low, since the reaction is difficult to proceed, 10° C. or more is preferred.

As a means for supplying a spinning solution 1, for example, a syringe pump, a tube pump, a dispenser, or the like may be used. Instead of the nozzle 2, a sawtooth-like gear, a wire, a slit, or the like may be used. Although the support 3 in FIG. 3 has a drum form, it may be a conveyor form. Although the support 3 is grounded in FIG. 3, the nozzle 2 may be grounded, and the voltage may be applied to the support 3. Alternatively, the voltage may be applied to both the nozzle 2 and the support 3 so that a potential difference is generated.

As a means for applying a voltage 4, for example, a DC high-voltage generator, or a Van de Graaff electromotive machine may be used. It is preferable to apply the voltage so that the electric field strength becomes 0.2 to 5 kV/cm, because the spinning solution can be spun to form fibers without causing dielectric breakdown of the air. Although the polar of the voltage applied may be positive or negative, an appropriate polar is selected in accordance with the characteristics of the spinning solution, so that the expansion of the inorganic nanofiber is suppressed, the inorganic nanofiber is uniformly dispersed, and an inorganic nanofiber sheet in which the pore size is uniform can be produced.

In the apparatus for electrospinning shown in FIG. 3, since the means for supplying a gas 7 (for example, a propeller fan, a sirocco fan, an air compressor, a blower equipped with a temperature and humidity adjustment function, or the like) and the means of exhaust 8 (for example, a fan) are connected to the spinning box 6, the atmosphere in the spinning box 6 can be made constant, and therefore, an inorganic nanofiber sheet in which the fiber diameter is uniform can be produced.

The inorganic nanofibers, which constitute the inorganic nanofiber sheet formed by electrospinning as described above, are in a state where the inorganic sol solution is gelled. In order to enhance the rigidity and strength of the inorganic nanofiber sheet, in order to improve the handling properties of the inorganic nanofiber sheet, and in order to easily produce the inorganic nanofibers in which the fiber length is uniform, it is preferable to carry out a heat treatment to convert the fibers to inorganic dried gel fibers or inorganic sintered fibers.

This heat treatment can be carried out using, for example, an oven, a sintering furnace, or the like. The inorganic dried gel fibers or inorganic sintered fibers can be obtained by appropriately determining the temperature and the time in accordance with the inorganic component which constitutes the inorganic nanofiber. For example, in the case of sintered alumina nanofibers, it is preferable to sinter the fibers at a temperature of 1200 to 1600° C. so that α-alumina having a good thermal conductivity can be obtained. The sintering time is preferably 2 hours or more so that the sintering may be carried out sufficiently, and a good thermal conductivity can be exhibited.

Next, the inorganic nanofiber sheet is pressed and crushed using a press machine, so that the average fiber length becomes 200 μm or less, and the CV value of the fiber length becomes 0.7 or less, to produce the inorganic nanofiber of the present invention. That is to say, the inorganic nanofiber sheet formed by electrospinning, or the sintered inorganic nanofiber sheet is in a state where the average fiber diameter is 2 μm or less, which is thin, the average pore size is small, the pore size is uniform, and the distances between the intersections of the inorganic nanofibers are short and uniform, as described above. When a pressure is applied to the inorganic nanofiber sheet in such a state using a press machine so that the orientation of the inorganic nanofibers is not changed, the intersections of the inorganic nanofibers are highly pressed, and the intersections are likely to be broken, because the inorganic nanofiber has a high rigidity and is not easily deformed, and therefore, inorganic nanofibers in which the fiber length is short and uniform can be produced. That is, since the intersections of the inorganic nanofibers correspond to the portions where the inorganic nanofibers are overlapped, and the thickness of the inorganic nanofiber sheet is microscopically increased, the pressure by a press machine preferentially acts on the intersections of the inorganic nanofibers. As a result, the inorganic nanofibers in which the fiber length is short and uniform can be produced.

With respect to this point, it will be explained on the basis of FIG. 1, which is a plain view schematically showing the state of arrangement of inorganic nanofibers in an inorganic nanofiber sheet formed by electrospinning, or a sintered inorganic nanofiber sheet, and FIG. 2, which is a plain view schematically showing the state of arrangement of inorganic nanofibers in an inorganic nanofiber sheet formed by a method other than electrospinning, or a sintered inorganic nanofiber sheet. For example, the intersections of inorganic nanofibers a1 to a3, b1 to b5, c1 to c6, d1 to d6, and e1 to e5 in FIG. 1 are in the state where two inorganic nanofibers intersect with one another, and therefore, the intersections have a thickness of about double the portions that do not intersect. Therefore, when pressure is applied to the inorganic nanofiber sheet of FIG. 1 using a press machine, the pressure is preferentially applied to the intersections of inorganic nanofibers a1 to a3, b1 to b5, c1 to c6, d1 to d6, and e1 to e5, and the inorganic nanofibers are broken at the intersections a1 to a3, b1 to b5, c1 to c6, d1 to d6, and e1 to e5, because the inorganic nanofiber has a high rigidity. As a result, the inorganic nanofibers in which the average fiber length is short (200 μm or less), and the CV value of the fiber length is uniform (0.7 or less) can be produced.

On the other hand, similarly, the intersections of inorganic nanofibers A1 to A3, B1 to B5, C1 to C7, D1 to D6, and E1 to E5 in the inorganic nanofiber sheet formed by a method other than electrospinning, or the sintered inorganic nanofiber sheet as shown in FIG. 2 are in the state where two inorganic nanofibers intersect with one another, and therefore, the intersections have a thickness of about double the portions that do not intersect. Therefore, when pressure is applied to the inorganic nanofiber sheet of FIG. 2 using a press machine, the pressure is preferentially applied to the intersections of inorganic nanofibers A1 to A3, B1 to B5, C1 to C7, D1 to D6, and E1 to E5, and the inorganic nanofibers are broken at the intersections A1 to A3, B1 to B5, C1 to C7, D1 to D6, and E1 to E5, because the inorganic nanofiber has a high rigidity. As a result, the inorganic nanofibers in which the CV value of the fiber length is uniform (0.7 or less) cannot be produced.

The pressure applied during the press by a press machine is not particularly limited, so long as the inorganic nanofibers having an average fiber diameter of 2 μm or less, an average fiber length of 200 μm or less, and a CV value of the fiber length of 0.7 or less can be produced. Pressure is applied, and the fiber length and the CV value of a fiber length are confirmed by experiment to determine an appropriate applied pressure. According to a press machine, the pressure acts areally, and a uniform pressure can be applied throughout the inorganic nanofiber sheet, and therefore, the inorganic nanofibers in which the fiber length is uniform can be easily produced.

It is preferable that at least the contact part of the press machine to the main surface of the inorganic nanofiber sheet is made of a nonmetallic material, because metal pieces or the like can be prevented from being mixed when being crushed. It is preferable that all materials which are brought into contact with the inorganic nanofiber sheet are made of nonmetallic materials. Examples of the nonmetallic material include ceramics, synthetic resins, and the like.

FIGS. 1 and 2 schematically show the state of arrangement of inorganic nanofibers in each inorganic nanofiber sheet, in which two inorganic nanofibers intersect with one another at the intersections of inorganic nanofibers. However, actually, since there exist intersections in which three inorganic nanofibers intersect with one another, and intersections in which four or more inorganic nanofibers intersect with one another, the thickness of each intersection is different from one another. The greater the number of crossings of inorganic nanofibers is, the stronger the pressure acts. Therefore, when a low pressure is applied, inorganic nanofibers are crushed at intersections where the number of crossings of inorganic nanofibers is high, and as the pressure to be applied is increased, inorganic nanofibers are crushed at intersections where the number of crossings of inorganic nanofibers is low. Therefore, the present invention is characterized in that the fiber length of the inorganic nanofiber can be controlled to some extent by the pressure to be applied. Further, according to the electrospinning, the inorganic nanofibers in which the fiber diameter is uniform to some extent can be spun. Therefore, the manufacturing method of the present invention is characterized in that the aspect ratio (fiber length/fiber diameter) can be controlled.

<Manufacturing Method of Inorganic Mixed Nanofiber>

In the manufacture of the inorganic mixed nanofiber, first of all, (1) the step of mixing a first spinnable sol solution, which is a material for a first inorganic oxide, with a second spinnable sol solution or a metal salt solution, which is a material for a second inorganic oxide having a refractive index different from that of the first inorganic oxide, to prepare a spinnable mixed sol solution, is carried out. The inventors found that an inorganic mixed nanofiber, which is uniformly mixed, can be produced by mixing the first and second solutions of which at least one (preferably both) is in the state of a spinnable sol.

The first inorganic oxide or the second inorganic oxide in the present invention is not particularly limited, but any inorganic oxide which is similar to the oxide constituting the inorganic component of the inorganic nanofiber, as previously described, and of which the refractive indices are different from one another, may be used.

More particularly, examples of the first inorganic oxide or the second inorganic oxide include $SiO_2$, $Al_2O_3$, $TiO_2$, $ZrO_2$, $B_2O_3$, $CeO_2$, $FeO$, $Fe_3O_4$, $Fe_2O_3$, $VO_2$, $V_2O_5$, $SnO_2$, $CdO$, $LiO_2$, $WO_3$, $Nb_2O_5$, $Ta_2O_5$, $In_2O_3$, $GeO_2$, $PbTi_4O_9$, $LiNbO_3$, $BaTiO_3$, $PbZrO_3$, $KTaO_3$, $Li_2B_4O_7$, $NiFe_2O_4$, and $SrTiO_3$.

In the present invention, it is preferable that the first inorganic oxide or the second inorganic oxide having a low refractive index, and the second inorganic oxide or the first inorganic oxide having a high refractive index is selected, because the refractive index can be easily adjusted. More particularly, silicon dioxide ($SiO_2$) may be exemplified as the inorganic oxide having a low refractive index, and aluminum oxide ($Al_2O_3$), titanium oxide ($TiO_2$), and zirconium dioxide ($ZrO_2$) may be exemplified as the inorganic oxide having a high refractive index.

In the manufacture of an inorganic mixed nanofiber having a high refractive index, such as a refractive index of 1.8 or more, it is preferable that aluminum oxide is regarded as an inorganic oxide having a low refractive index, and titanium oxide ($TiO_2$) or zirconium dioxide ($ZrO_2$) is regarded as an inorganic oxide having a high refractive index.

With respect to the refractive index in the present invention, along with the preparation of a contact liquid (=a refractive liquid, manufactured by Shimadzu Corporation), a dispersion in which an object to be determined is dispersed in the contact liquid so that the solid content becomes 10 mass % is prepared. The transmittance of the contact liquid and the dispersion in an incident light at a wavelength of 587.5 nm was measured using a spectrophotometer (UV-VIS). When the matching rate (Ar), which is defined by the following equation and calculated from the transmittance (Ts) of the contact liquid (refractive liquid) and the transmittance (Td) of the dispersion, is 95% or more, it is regarded that the refractive index of the object to be determined is the same as the refractive index of the contact liquid.

$$Ar=(Td/Ts)\times 100$$

The first spinnable sol solution or the second spinnable sol solution in the present invention is a material for the first inorganic oxide or the second inorganic oxide. The first spinnable sol solution or the second spinnable sol solution may be obtained by hydrolysis and polycondensation of a solution (material solution) containing a compound including a metal element which constitutes the first inorganic oxide or the second inorganic oxide at a temperature of 10 to 100° C.

The solvent of the material solution may be, for example, an organic solvent (for example, alcohols such as ethanol, or dimethyl formamide) and/or water.

As previously described, silicon dioxide ($SiO_2$), aluminum oxide ($Al_2O_3$), titanium oxide ($TiO_2$), or zirconium dioxide ($ZrO_2$) may be preferably used as the first inorganic oxide or the second inorganic oxide. As the compound which constitutes the material solution, for example, when the inorganic oxide is silicon dioxide, silicon alkoxides such as tetraethoxysilane may be exemplified; when the inorganic oxide is aluminum oxide, aluminum alkoxides such as aluminum sec-butoxide may be exemplified; when the inorganic oxide is titanium oxide, titanium alkoxides such as titanium tetra-n-butoxide may be exemplified; and when the inorganic oxide is zirconium dioxide, zirconium alkoxides such as zirconium tetra-n-butoxide may be exemplified.

The material solution may contain water and/or a catalyst (for example, an acid catalyst, such as hydrochloric acid or nitric acid; a base catalyst, such as tetrabutylammonium hydroxide; or a salt catalyst, such as hydrazinium chloride) in order to carry out the polycondensation.

On the other hand, the metal salt solution, which may be used instead of the second spinnable sol solution in the present invention, is not particularly limited, so long as it is a solution containing a salt of the above-mentioned metal element (for example, chlorides, sulfates, phosphates, carbonates, hydrogen phosphates, hydrogen carbonates, nitrates, acetates, hydroxides, or the like). The solvent of the metal salt solution is not particularly limited, so long as it is a solvent capable of dissolving the metal salt. Examples of the solvent include water, alcohols, ketones, amides (for example, N,N-dimethylformamide, dimethylacetamide, or the like), and the like.

In the manufacture method of the present invention, a spinnable mixed sol solution is prepared by mixing the first spinnable sol solution with the second spinnable sol solution or the metal salt solution. If gelation occurs during the mixing, the solutions cannot be uniformly mixed, the adjustment of the refractive index becomes difficult, and fibers cannot be produced. Therefore, in order to avoid the gelation, after the potential hydrogen of the first spinnable sol solution is matched with that of the second spinnable sol solution or the metal salt solution, they are mixed. For example, when the first spinnable sol solution is a material of silicon dioxide, which is preferable, the first spinnable sol solution is likely to be gelled by the change of the potential hydrogen, and therefore, it is mixed with a second spinnable sol solution or a metal salt solution having the same potential hydrogen as that of the first spinnable sol solution, or having a potential hydrogen lower than that of the first spinnable sol solution. More particularly, when the potential hydrogen of the first spinnable sol solution is 2, it is mixed with a second spinnable sol solution or a metal salt solution having a potential hydrogen of 2 or less. However, if gelation does not occur when it is mixed with a second spinnable sol solution or a metal salt solution having a potential hydrogen higher than 2, such a second spinnable sol solution or a metal salt solution can be used in the present invention. As described above, the wording "the potential hydrogen is matched" as used herein means a potential hydrogen capable of preparing a spinnable mixed sol solution in which gelation does not occur during the mixing. Since the potential hydrogen varies depending on, for example, the combination of the first spinnable sol solution with the second spinnable sol solution or the metal salt solution, the mixing ratio, and the like, the potential hydrogen can be determined by carrying out experiments in a predetermined combination, mixing ratio, and the like, and confirming whether or not the spinnable mixed sol solution can be prepared without being gelled. The potential hydrogen of the first spinnable sol solution, the second spinnable sol solution, or the metal salt solution may be adjusted by the selection of a catalyst used for preparing the first spinnable sol solution or the second spinnable sol solution, or by the addition of an acid or a base. The potential hydrogen may be measured using a pH meter (for example, manufactured by HORIBA).

In the present invention, since the refractive index of the inorganic mixed nanofiber can be adjusted, only by adjusting the mixing ratio of the first inorganic oxide derived from the first spinnable sol solution and the second inorganic oxide derived from the second spinnable sol solution or the metal salt solution, the inorganic mixed nanofiber having a desired refractive index can be easily produced. That is, it has been found in the present invention that when the first spinnable sol solution, which is in a spinnable state, is mixed with the second spinnable sol solution or the metal salt solution, which is in a spinnable state, without being gelled, and electrospinning is carried out using the obtained spinnable mixed sol solution, these can be uniformly mixed, and the inorganic mixed nanofiber having a desired refractive index can be easily produced.

More particularly, on the basis of the desired refractive index (n) of the inorganic mixed nanofiber, the refractive index ($n_1$) of the first inorganic oxide obtainable from the first spinnable sol solution, the refractive index ($n_2$) of the second inorganic oxide obtainable from the second spinnable sol solution or the metal salt solution, the specific gravity (p) of the inorganic mixed nanofiber, the specific gravity ($\rho_1$) of the first inorganic oxide obtainable from the first spinnable sol solution, and the specific gravity ($\rho_2$) of the second inorganic oxide obtainable from the second spinnable sol solution or the metal salt solution; from the theoretical Lorentz-Lorenz's formula (Equation (2) below), and the specific gravity ($\rho_1$) of the first inorganic oxide obtainable from the first spinnable sol solution, the specific gravity ($\rho_2$) of the second inorganic oxide obtainable from the second spinnable sol solution, and a relational expression between the mass fraction (X=1-Y) of the first inorganic oxide or the mass fraction (Y=1-X) of the second inorganic oxide, and the specific gravity ($\rho$) of the inorganic mixed nanofiber; a relational expression between the desired refractive index (n) of the inorganic mixed nanofiber, and the mass fraction (X) of the first inorganic oxide or the mass fraction (Y) of the second inorganic oxide can be derived.

The inorganic mixed nanofiber having the desired refractive index can be produced by mixing the first spinnable sol solution with the second spinnable sol solution or the metal salt solution so as to become the mass fractions (X, Y) of the first inorganic oxide and the second inorganic oxide as above.

[Math. 1]

$$\frac{n^2-1}{n^2+2} = X \times \frac{\rho(n_1^2-1)}{\rho_1(n_1^2+2)} + Y \frac{\rho(n_2^2-1)}{\rho_2(n_2^2+2)} \qquad (2)$$

In connection with this, the relational expression between the mass fraction (X) of the first inorganic oxide or the mass fraction (Y) of the second inorganic oxide and the specific gravity ($\rho$) of the inorganic mixed nanofiber can be derived, using the approximation formula calculation function of Microsoft Office Excel (product name), on the basis of (1) the specific gravity ($\rho_1$) of a fiber made from the first inorganic oxide produced at the same sintering temperature as that when producing the desired inorganic mixed nanofiber, (2) the specific gravity ($\rho_2$) of a fiber made from the second inorganic oxide produced at the same sintering temperature as that when producing the desired inorganic mixed nanofiber, and (3) the specific gravity ($\rho$) of a fiber made from the first inorganic oxide and the second inorganic oxide at an arbitrary mass fraction produced at the same sintering temperature as that when producing the desired inorganic mixed nanofiber, on the basis of a graph on which [specific gravity: $\rho_1$, $\rho_2$, and $\rho$] and [mass fraction (X) of the first inorganic oxide or mass fraction (Y) of the second inorganic oxide] are plotted.

The specific gravity ($\rho_1$) of the first inorganic oxide, the specific gravity ($\rho_2$) of the second inorganic oxide, and the specific gravity ($\rho$) of the inorganic mixed nanofiber can be calculated from the ratio of the density measured using a dry automatic density meter (manufactured by Shimadzu Corporation, Accupyc II) to the density of pure water at 1 atom and 4° C.

For example, when a silicon dioxide/zirconium dioxide mixed nanofiber (sintering temperature: 800° C.) having a refractive index of n is produced from the first spinnable sol solution as a material for silicon dioxide [refractive index ($n_1$): 1.46 (wavelength: at 500 nm), specific gravity ($\rho_1$)= 2.01 g/cm$^3$] and the second spinnable sol solution as a material for zirconium dioxide [refractive index ($n_2$): 2.21 (wavelength: at 500 nm), specific gravity ($\rho_2$)=5.71 g/cm$^3$], the following equation (3), as the relational expression between the mass fraction (Y) of zirconium dioxide and the specific gravity ($\rho$) of the inorganic mixed nanofiber, can be derived using the approximation formula calculation function of Microsoft Office Excel (product name), on the basis of a graph on which the specific gravity [$\rho_1$, $\rho_2$, and $\rho$] measured by experiment and [weight ratio (Y) of the second inorganic oxide] are plotted:

$$\rho=3.6955Y+2.0124 \qquad \text{Equation (3)}$$

Next, the following equation (4), as the relational expression between the refractive index (n) of the silicon dioxide/zirconium dioxide mixed nanofiber and the mass fraction (Y) of zirconium dioxide, can be derived from the equation (3) and the theoretical Lorentz-Lorenz's formula, using the approximation formula calculation function of Microsoft Office Excel (product name), on the basis of a graph on which the refractive index [$n_1$, $n_2$, and n] and [weight ratio (Y) of the second inorganic oxide] are plotted:

$$n=0.7427Y+1.4695 \qquad \text{Equation (4)}$$

Therefore, for example, when the silicon dioxide/zirconium dioxide mixed nanofiber having a refractive index (n) of 1.51, which is the same refractive index as that of polyacrylonitrile, the silicon dioxide/zirconium dioxide mixed nanofiber having a refractive index of 1.51 can be produced by preparing a spinnable mixed sol solution by mixing the first spinnable sol solution and the second spinnable sol solution so that the weight ratio of silicon dioxide to zirconium dioxide complies with the equation (4). In this case, the silicon dioxide/zirconium dioxide mixed nanofiber having a refractive index of 1.51 can be produced by preparing a spinnable mixed sol solution by mixing the first spinnable sol solution and the second spinnable sol solution so that the weight ratio of silicon dioxide to zirconium dioxide (silicon dioxide:zirconium dioxide) complies with 0.945:0.055.

The above-mentioned example is a case of producing the silicon dioxide/zirconium dioxide mixed nanofiber, and a mixed nanofiber of a combination of other metal oxides can be produced in a similar manner. That is, the relational expression between the mass fraction (X) of the first inorganic oxide or the mass fraction (Y) of the second inorganic oxide and the specific gravity ($\rho$) of the inorganic mixed nanofiber is determined, and then, from this equation and the theoretical Lorentz-Lorenz's formula, the relational expression between the refractive index (n) of the inorganic mixed nanofiber and the mass fraction (X) of the first inorganic oxide or the mass fraction (Y) of the second inorganic oxide can be derived. Therefore, the mass fraction (X) of the first inorganic oxide and the mass fraction (Y=1-X) of the second inorganic oxide can be derived by assuming a desired refractive index as the refractive index (n) of the inorganic mixed nanofiber, on the basis of the relational expression between the refractive index (n) of the inorganic mixed nanofiber and the mass fraction (X) of the first inorganic oxide or the mass fraction (Y) of the second inorganic oxide.

As can be understood from the above, when the first inorganic oxide is silicon dioxide ($SiO_2$) having a low refractive index, and the second inorganic oxide is titanium dioxide ($TiO_2$) having a high refractive index, the refractive index of the inorganic mixed nanofiber can be adjusted over a wide range from approximately 1.46 (wavelength: 500 nm), which corresponds to the refractive index of silicon dioxide, to approximately 2.4 (wavelength: 500 nm), which corresponds to the refractive index of titanium dioxide.

In the spinnable mixed sol solution prepared as described above, the viscosity is preferably 10 mPa·s to 10 Pa·s, more preferably 50 mPa·s to 5 Pa·s, and still more preferably 100 mPa·s to 3 Pa·s, so that electrospinning is easily carried out. When the viscosity is higher than 10 Pa·s, it is difficult to spin fine mixed gel nanofibers. When the viscosity is lower than 10 mPa·s, there is a tendency that a fibrous form per se cannot be obtained. In connection with this, when a nozzle is used and the atmosphere at the nozzle tip portion is the same solvent gas atmosphere as the solvent of the spinnable mixed sol solution, even if the viscosity of the spinnable mixed sol solution is higher than 10 Pa·s, there is a case wherein fibers can be spun.

The spinnable mixed sol solution can contain an organic component. Examples of the organic component include an organic low-molecular compound, such as a silane coupling agent or a dye, an organic high-molecular compound to adjust adhesiveness, flexibility, or hardness (friability), such as polymethyl methacrylate, a chelating agent which stabilizes a compound, a compound capable of imparting various functions such as piezoelectricity, and the like. More particularly, when the compound contained in the material solution of the first spinnable sol solution or the second spinnable sol solution is a silane compound, it can contain a compound obtained by polycondensating a silane compound organically modified with a methyl group or an epoxy group. These organic components can be added, before the polycondensating, during the polycondensating, or after the polycondensating. Further, they can be added during the mixing of, or after the mixing of, the first spinnable sol solution and the second spinnable sol solution.

The spinnable mixed sol solution can contain inorganic or organic microparticles. Examples of the inorganic microparticles include titanium oxide, manganese dioxide, copper oxide, silicon dioxide, activated carbon, and a metal (for example, platinum). Examples of the organic microparticles include a dye and a pigment. The average particle size of the microparticle is not particularly limited, but it is preferably 0.001 to 1 m, and more preferably 0.002 to 0.1 m. These microparticles can impart an optical function, porosity, cell affinity, a catalytic function, a protein adsorption function, an ion exchange function, or the like.

Next, (2) the above-mentioned spinnable mixed sol solution is spun by electrospinning, to form an inorganic mixed nanofiber sheet consisting of mixed gel nanofibers. This electrospinning is a known method, in which the spinnable mixed sol solution is drawn to form fibers by applying an electric field to the spinnable mixed sol solution. The fiberizing mixed gel nanofibers are directly accumulated to form an inorganic mixed nanofiber sheet. This inorganic mixed nanofiber sheet can be formed in a similar manner to that of electrospinning as described in <Manufacturing method of inorganic nanofiber>.

The inorganic mixed nanofibers, which constitute the inorganic mixed nanofiber sheet formed by electrospinning as described above, are in a state where the spinnable mixed sol solution is gelled. In order to easily produce the inorganic mixed nanofibers in which the fiber diameter is uniform, in order to easily produce the inorganic mixed nanofibers having a good mechanical strength, and in order to improve the handling properties of the inorganic mixed nanofiber sheet, it is preferable to carry out a heat treatment (in particular, sintering) of the gelled inorganic mixed nanofibers (hereinafter sometimes referred to as "mixed gel nanofibers").

This heat treatment (in particular, sintering) can be carried out by a conventional known method, for example, using an oven, a sintering furnace, or the like. The temperature of the heat treatment (in particular, the sintering temperature) and the time can be appropriately determined in accordance with the inorganic component which constitutes the mixed gel nanofiber.

When silicon dioxide, titanium oxide, or zirconium dioxide is contained as the inorganic oxide, which constitutes the inorganic mixed nanofiber, it is preferable that after a preliminary sintering is carried out at a temperature of approximately 300° C. for approximately 1 hour to remove the organic components, a main sintering is carried out at a temperature of approximately 800° C. for approximately 2 hours.

As described above, when the mixed gel nanofibers are formed by electrospinning and accumulated on the support, the mixed gel nanofibers are adhered to one another to become in a state of a fiber sheet form in which the mixed gel nanofibers are randomly dispersed, and therefore, the fiber sheet form is maintained after the heat treatment (in particular, sintering). In order to obtain short fibers (for example, fillers) consisting of individual inorganic mixed nanofibers, the fiber sheet is crushed so that it becomes individual inorganic mixed nanofibers.

With respect to this crushing, in order to uniformly improve the mechanical properties and thermal properties of the filler-dispersed organic resin composite, such as a resin sheet, or in order to uniform the fiber length of the inorganic mixed nanofibers, in a similar manner to the crushing method described in <Manufacturing method of inorganic nanofiber>, the inorganic fiber sheet is pressed and crushed using a press machine to obtain the inorganic mixed nanofibers. In particular, inorganic mixed nanofibers having an average fiber diameter of 2 μm or less, an average fiber length of 200 μm or less, a CV value of the fiber length of 0.7 or less, and a rate of change in fiber length of 30% or less can be obtained.

<Filler-Dispersed Organic Resin Composite>

The filler-dispersed organic resin composite (hereinafter sometimes and simply referred to as "composite") of the present invention is a composite in which the above-mentioned inorganic nanofibers are dispersed in an organic resin, as an inorganic fibrous filler. The inorganic nanofiber of the present invention is an inorganic nanofiber, in which the average fiber diameter is 2 μm or less, which is thin; despite the fact that the average fiber length is 200 μm or less, which could not be obtained by a conventional cutting machine, the CV value of the fiber length is 0.7 or less, i.e., the fiber length is uniform; and the mechanical strength is superior. Therefore, the composite in which such inorganic nanofibers are dispersed exhibits good mechanical properties, a good form stability against a temperature change, and uniform properties.

Further, it may be a composite having a thin thickness and uniform properties. For example, even when the inorganic nanofibers are used as an inorganic fibrous filler for a thin-film polymer film, since it is unlikely to protrude from the surface of the polymer film, it is a polymer film composite which is practically problem-free.

Further, since the inorganic mixed nanofibers produced by the above-mentioned manufacturing method have a desired refractive index, the composite in which they are used as a filler for a transparent resin exhibits good and uniform mechanical properties (for example, impact resistance, tensile strength, or the like) and thermal properties (for example, thermal extension suppression or the like), without impairing the transparency of the transparent resin. In order to enhance the affinity between the inorganic mixed nanofiber and the organic resin, it is preferable that the surface of the inorganic mixed nanofiber is modified with a surface treatment agent, such as a silane coupling agent.

In particular, when the inorganic nanofiber is an alumina nanofiber, it exhibits, in addition to the mechanical strength, a good thermal conductivity of 3 W/m·K or more (preferably 3.1 W/m·K or more, more preferably 3.2 W/m·K or more, still more preferably 3.3 W/m·K or more, still more preferably 3.4 W/m·K or more) at a thickness of 0.3 mm.

The thermal conductivity as used herein means a value determined as follows: (1) A test piece (length 10 mm, width 10 mm, and thickness 0.3 mm) is taken from the composite. In case such a test piece (length 10 mm, width 10 mm, and thickness 0.3 mm) cannot be taken, it can be substituted with a test piece (length 1 mm or more, width 1 mm or more, and thickness 0.3 mm). In connection with this, flat and smooth portions are necessary in the longitudinal direction and the width direction of the test piece. (2) The thermal diffusivity, the specific heat, and the density of this test piece are measured in the following methods, and the thermal conductivity of the test piece is calculated from the following equation (A).

<Thermal Diffusivity>

The thermal diffusivity is measured at room temperature, using a thermal conductivity measuring device (registered trademark: ai-Phase Mobile, manufactured by ai-Phase Co., Ltd.) by a temperature wave analysis. In case the thickness of the composite is less than 0.3 mm, and a test piece having a thickness of 0.3 mm cannot be taken, a value converted to a thickness of 0.3 mm is measured using the thermal conductivity measuring device.

<Specific Heat>

The specific heat is measured using a differential scanning calorimeter (DSC) by comparison with a sapphire reference material.

<Density>

The Density is measured by an Archimedes' method.

<Thermal Conductivity>

(Thermal conductivity)=(Thermal diffusivity)×(Specific heat)×(Density).     (A)

In addition to the alumina nanofiber, a non-fibrous alumina filler, for example, a particulate, plate-like, needle-like, or flake-like filler, may be contained therein.

When the composite contains the alumina nanofibers, regardless of whether or not the non-fibrous alumina fillers are contained therein, the volume percentage of the alumina nanofibers to the whole volume of the composite is preferably 50% or less, more preferably 48% or less, still more preferably 45% or less, still more preferably 40% or less, still more preferably 30% or less, and still more preferably 20% or less, so that the mechanical strength and the thermal conductivity become uniform. On the other hand, the volume percentage is preferably 3% or more, more preferably 5% or more, still more preferably 8% or more, and still more preferably 10% or more, so that the thermal conductivity becomes good.

The form of the composite varies according to the use, and is not particularly limited, but may be, for example, a fibrous form; two-dimensional forms, such as a sheet-like form, a thin film having a thickness of 1 mm or less, or a plate having a thickness of more than 1 mm; or three-dimensional forms, for example, rectangular parallelepiped, columnar bodies, such as cylinder or prism, cone solids, such as cone or pyramid, sphere, or hollow columnar bodies, such as cylinder or prism having a hollow portion. In particular, since the inorganic nanofiber of the present invention is fine, and its average fiber length is short, a thin film having a thickness of 1 mm or less can be produced, and further, even when it is a thin-film polymer film having a thickness of 200 μm or less, since the inorganic nanofibers are unlikely to protrude from the surface, a composite polymer film which is practically problem-free can be easily produced. In particular, when the inorganic mixed nanofibers having an average fiber length of 100 μm or less (in particular, less than 100 m) and a CV value of the fiber length of 0.7 or less (i.e., the fiber length is uniform) are used, even when it is a thin-film, transparent resin film having a thickness of 100 μm or less (in particular, less than 100 m), since the inorganic nanofibers are unlikely to protrude from the surface, the composite transparent resin film is practically problem-free.

Such a composite can be produced by a conventional method. For example, the inorganic nanofibers are mixed with a solution dissolving an organic resin to prepare a dispersion of inorganic nanofibers, and then, the resulting dispersion is applied and dried on a certain surface to produce a composite having a two-dimensional form. Alternatively, the inorganic nanofibers are mixed with a melting polymer of organic resin to prepare an inorganic nanofibers-dispersed melting polymer, and then, the inorganic nanofibers-dispersed melting polymer is molded to produce a composite having a two-dimensional or three-dimensional form. In connection with this, the composite having a two-dimensional form is further shaped into a composite having a three-dimensional form.

The contents, ratio, and the like of the inorganic nanofibers and the organic resin (matrix resin) in the composite vary according to the use, and are not particularly limited, but the content of the inorganic nanofibers contained in the composite is preferably 0.1 mass % or more with respect to the whole composite, so that the mechanical properties become good. On the other hand, the content of the inorganic nanofibers contained in the composite is preferably 30 mass % or less, more preferably 20 mass % or less, still more preferably 15 mass % or less, and still more preferably 10 mass % or less, so that the uniformity becomes good.

The organic resin (matrix resin) varies according to the use of the composite, and is not particularly limited. For example, when the composite is used as a substrate for a flexible circuit board, Examples of the organic resin include thermosetting resins, such as phenolic resins, epoxy resins, polyimide resins, isocyanate resins, unsaturated polyester resins, maleimide resins, or the like; thermosetting resin components obtained by appropriately formulating and/or reacting two or more of these thermosetting resins; one or more of the thermosetting resins modified with polyvinyl butyral, an acrylonitrile-butadiene rubber, or polyfunctional acrylate compounds, or additives or the like; organic resins obtained using cross-linked polyethylene, cross-linked polyethylene/epoxy resins, cross-linked polyethylene/cyanate resins, polyphenylene ether/cyanate resins, or cross-linked thermosetting resins (IPN or semi-IPN) modified with other thermoplastic resins; or the like.

When the composite is used as an ion-conducting material, examples of such a matrix resin include a perfluorinated sulfonic acid polymer, or a polyethylene oxide gel containing a metal ion, or the like. Further, in accordance with the use, low dielectric constant resin, high dielectric constant resins, ion-exchange resins, hole and electron conductive resins, organic semiconductors, ultraviolet curing resins, silicone rubber or gel, ultrafine-particle composite resins having conductivity, abrasiveness, or the like, low-strength resins such as polyethylene wax, urethane foam, composite piezoelectric resins containing piezoelectric polymers or piezoelectric inorganic particles, or the like may be used as matrix resins.

When a composite containing alumina nanofibers is used in a semiconductor device application or a thermal printer application, examples of the organic resin include epoxy resins, polyimide resins, fluorine resins, acrylic resins, polyester resins, silicone polyester resins, or the like. When it is used in an adhesive application, examples of the organic resin include styrene-based elastomers, polyamides, polyesters, polyurethanes, polyolefins, or the like. When it is used in a solar cell application, examples of the organic resin include an ethylene-vinyl acetate copolymer (EVA), polyimides, polyester resins, or the like.

EXAMPLES

The present invention now will be further illustrated by, but is by no means limited to, the following Examples.

Example 1

Tetraethyl orthosilicate, water, and hydrochloric acid were mixed at a molar ratio of 1:2:0.0025, and the mixture was heated and stirred at a temperature of 80° C. for 15 hours. The reaction mixture was concentrated using an evaporator until the silica concentration became 44 wt %, and was thickened until the viscosity became 200 to 300 mPa·s, to obtain a silica sol solution.

Next, spinning was carried out using the silica sol solution under the spinning conditions shown in Table 1, and sintering was carried out under the sintering conditions shown in Table 1, to obtain a silica nanofiber sheet having an average fiber diameter of 1 Lm (mass per unit area: 26.0 g/m$^2$).

TABLE 1

| Unit | Spinning conditions | | | | Sintering conditions in sintering furnace |
|---|---|---|---|---|---|
| | #1 g/hr. | #2 cm | #3 ° C./% RH | #4 kV | ° C./hr. |
| Example 1 | 1 | 10 | 25/30 | +10 | 800/2 |
| Example 2 | 1 | 10 | 25/30 | +10 | 800/2 |
| Example 3 | 1 | 10 | 25/30 | +30 | 800/2 |
| Example 4 | 0.2 | 5 | 25/20 | +10 | 800/2 |
| Comp. Example 1 | 1 | 10 | 25/30 | +10 | 800/2 |
| Comp. Example 2 | 1 | 10 | 25/30 | +10 | 800/2 |
| Comp. Example 3 | 1 | 10 | 25/30 | +10 | 800/2 |

1: Amount extracted (Amount extruded from nozzle)
2: Distance (Distance between nozzle tip and drum support)
3: Temperature and humidity (Temperature and humidity in spinning box)
4: Voltage applied (Voltage applied to nozzle)

Next, approximately 1 g of the silica nanofiber sheet was weighed out, and the silica nanofiber sheet was stacked so that the thickness became 1.5 cm. The stacked sheet was pressed and crushed using a press machine at a pressure of 2 MPa for 30 seconds, to prepare inorganic sintered nanofibers having an average fiber diameter of 1 μm, an average fiber length of 99.2 μm, and a CV value of the fiber length of 0.186 (aspect ratio: 99).

Example 2

Approximately 1 g of a silica nanofiber sheet (mass per unit area: 26.0 g/m$^2$), which had been prepared in a similar manner to that of Example 1, was weighed out, and the silica nanofiber sheet was stacked so that the thickness became 1.5 cm. The stacked sheet was pressed and crushed using a press machine at a pressure of 10 MPa for 30 seconds, to prepare inorganic sintered nanofibers having an average fiber diameter of 1 μm, an average fiber length of 10 μm, and a CV value of the fiber length of 0.266 (aspect ratio: 10).

Example 3

Zirconium tetra-n-butoxide [Zr(OnBu)$_4$], ethyl acetoacetate, hydrazinium chloride, and water were mixed at a molar ratio of 1:1.75:0.02:1.5, and the mixture was stirred at room temperature for 3 days. The reaction mixture was concentrated using an evaporator until the zirconia concentration became 30 wt %, and was thickened until the viscosity became 2100 to 2700 mPa·s, to obtain a zirconia sol solution.

Next, spinning was carried out using the zirconia sol solution under the spinning conditions shown in Table 1, and sintering was carried out under the sintering conditions shown in Table 1, to obtain a zirconia nanofiber sheet having an average fiber diameter of 500 nm (mass per unit area: 17.4 g/m$^2$).

Next, approximately 1 g of the zirconia nanofiber sheet was weighed out, and the zirconia nanofiber sheet was stacked so that the thickness became 1.5 cm. The stacked sheet was pressed and crushed using a press machine at a pressure of 1 MPa for 1 second, to prepare inorganic sintered nanofibers having an average fiber diameter of 500 nm, an average fiber length of 94.0 μm, and a CV value of the fiber length of 0.289 (aspect ratio: 188).

Example 4

Spinning was carried out using a silica sol solution, which had been prepared in a similar manner to that of Example 1, under the spinning conditions shown in Table 1, and sintering was carried out under the sintering conditions shown in Table 1, to obtain a silica nanofiber sheet having an average fiber diameter of 200 nm (mass per unit area: 13.0 g/m$^2$).

Next, approximately 1 g of the silica nanofiber sheet was weighed out, and the silica nanofiber sheet was stacked so that the thickness became 1.5 cm. The stacked sheet was pressed and crushed using a press machine at a pressure of 13 MPa for 30 seconds, to prepare inorganic sintered nanofibers having an average fiber diameter of 200 nm, an average fiber length of 10 μm, and a CV value of the fiber length of 0.164 (aspect ratio: 50).

Comparative Example 1

A silica nanofiber sheet, which had been prepared in a similar manner to that of Example 1, was crushed using an automatic mortar. More particularly, approximately 1 g of the silica nanofiber sheet was weighed out, and an appropriate amount of water was added to the automatic mortar. The sheet was crushed using the automatic mortar for 2 hours, to prepare inorganic sintered nanofibers having an average fiber diameter of 1 μm, an average fiber length of 28.2 μm, and a CV value of 1.27 (aspect ratio: 28.2).

Comparative Example 2

A silica nanofiber sheet, which had been prepared in a similar manner to that of Example 1, was crushed using an automatic mortar. More particularly, approximately 1 g of the silica nanofiber sheet was weighed out, and an appropriate amount of water was added to the automatic mortar. The sheet was crushed using the automatic mortar for 4 hours, to prepare inorganic sintered nanofibers having an average fiber diameter of 1 μm, an average fiber length of 29.2 μm, and a CV value of the fiber length of 0.73 (aspect ratio: 29.2).

Comparative Example 3

We attempted to crush a silica nanofiber sheet, which had been prepared in a similar manner to that of Example 1, using a ball mill, but it could not be crushed. More particularly, the container space ratio (silica nanofiber sheet:ball: space) in the ball mill was set at 1:1:1, and the zirconia ball mill (diameter: 3 mm, weight: 100 g) was rotated at approximately 180 rotations/min. for 2 hours, but the silica nanofiber sheet could not be crushed, and inorganic sintered nanofibers could not be prepared.

Example 5

Inorganic mixed nanofibers were prepared in accordance with the following procedure so that the refractive index of the inorganic mixed nanofiber became that of a polyacrylonitrile resin (1.51).

Tetraethyl orthosilicate, water, and hydrochloric acid were mixed at a molar ratio of 1:2:0.0025, and the mixture was heated and stirred at a temperature of 80° C. for 15 hours. The reaction mixture was concentrated using an evaporator until the silica concentration became 45 wt %, and was thickened until the viscosity became 200 to 300 mPa·s, to obtain a first spinnable silica sol solution [potential hydrogen (pH)=2.00, refractive index of silica: 1.46, specific gravity of silica: 2.01 g/cm$^3$].

In parallel with this, zirconium tetra-n-butoxide [Zr (OnBu)$_4$], ethyl acetoacetate, hydrazinium chloride, and water were mixed at a molar ratio of 1:1.75:0.02:1.5, and the mixture was stirred at room temperature for 3 days. The reaction mixture was concentrated using an evaporator until the zirconia concentration became 30 wt %, and was thickened until the viscosity became 2100 to 2700 mPa·s, to obtain a second spinnable zirconia sol solution [potential hydrogen (pH)=2.00, refractive index of zirconia: 2.21, specific gravity of zirconia: 5.71 g/cm$^3$].

When a silica-zirconia mixed nanofiber was sintered at 800° C., a relational expression between the refractive index (n) of the silica-zirconia mixed nanofiber and the mass fraction (Y) of zirconium dioxide was Equation (5). A spinnable mixed sol *solution* was prepared without being gelled by mixing the first spinnable sol solution and the second spinnable sol solution so that the mass fractions of silicon dioxide:zirconium dioxide became 0.945:0.055.

$$n=0.7427Y+1.4695 \qquad \text{Equation (5)}$$

Next, spinning was carried out using the spinnable mixed sol solution, and an electrospinning apparatus as shown in FIG. 3, under the following spinning conditions to prepare mixed gel nanofibers, and sintering was carried out under the following sintering conditions to obtain a silica-zirconia mixed nanofiber sheet having an average fiber diameter of 1 μm.

(Spinning Conditions)
Discharge rate from the nozzle of spinnable mixed sol solution, which was supplied from the syringe pump: 0.5 g/hr.

Nozzle inner diameter: 0.33 mm
Support (ground): stainless steel drum (outer diameter: 35 cm)
Distance between nozzle tip and drum support: 10 cm
Spinning box: acrylic resin cubic container (one side: 1 m) with an exhaust outlet
Temperature and humidity in the spinning box: air at 25° C./25% RH was supplied by a temperature and humidity controller
Voltage applied to the nozzle by a DC high-voltage generator: +10 kV (Sintering conditions in sintering furnace)
800° C./2 hours Next, approximately 1 g of the silica-zirconia mixed nanofiber sheet was weighed out, and the silica-zirconia mixed nanofiber sheet was stacked so that the thickness became approximately 1.5 cm. The stacked sheet was pressed and crushed using a press machine at a pressure of 2 MPa for 30 seconds, to obtain silica-zirconia mixed nanofibers having an average fiber diameter of 1 m, an average fiber length of 100 m, a CV value of the fiber length of 0.294, an aspect ratio of 100, and a refractive index of 1.51 (matching rate with a refractive liquid: 97%).

Example 6

The procedure described in Example 5 was repeated, except that a spinnable mixed sol solution was prepared without being gelled by mixing the first spinnable sol solution and the second spinnable sol solution so that the mass fractions of silicon dioxide:zirconium dioxide became 0.878:0.122, based on a relational expression similar to that of Example 5, so that the refractive index of the silica-zirconia mixed nanofiber became that of a polyimide resin (1.56), to obtain silica-zirconia mixed nanofibers having an average fiber diameter of 1 μm, an average fiber length of 100 μm, a CV value of the fiber length of 0.265, an aspect ratio of 100, and a refractive index of 1.56 (matching rate with a refractive liquid: 97%).

Example 7

Inorganic mixed nanofibers were prepared in accordance with the following procedure so that the refractive index of the inorganic mixed nanofiber became that of a polyacrylonitrile resin (1.51).

After a spinnable mixed sol solution was prepared in a similar manner to that of Example 5, the procedure described in Example 1 was repeated, except that a diluted spinnable mixed sol solution prepared by mixing the spinnable mixed sol solution, polyvinylpyrrolidone, and N,N-dimethylformamide at a mass ratio of 3:1:16 (the solid content of the inorganic oxide of the spinnable mixed sol solution:polyvinylpyrrolidone:N,N-dimethylformamide) was spun, to obtain silica-zirconia mixed nanofibers having an average fiber diameter of 200 nm, an average fiber length of 20 μm, a CV value of the fiber length of 0.288, an aspect ratio of 100, and a refractive index of 1.51 (matching rate with a refractive liquid: 97%).

Reference Example 1

Inorganic mixed nanofibers were prepared in accordance with the following procedure so that the refractive index of the inorganic mixed nanofiber became that of a polyacrylonitrile resin (1.51).

Zirconium tetra-n-butoxide:tetraethyl orthosilicate: ethyl acetoacetate:hydrochloric acid:water:2-propanol were mixed at a molar ratio of 0.067:1:0.134:0.0025:1:25, and the mixture was stirred at room temperature for 3 days. The reaction mixture was concentrated until the concentration which was converted into a silica-zirconia mixed oxide became 30 wt % to obtain a spinnable silica-zirconia sol solution. In this case, zirconium tetra-n-butoxide and tetraethyl orthosilicate function as inorganic materials, ethyl acetoacetate functions as a ligand, and hydrochloric acid functions as a catalyst.

Next, the procedure described in Example 5 was repeated, except that this spinnable silica-zirconia sol solution was spun, to obtain silica-zirconia mixed nanofibers having an average fiber diameter of 500 nm, an average fiber length of 50 m, a CV value of the fiber length of 0.243, an aspect ratio of 100, and a refractive index of 1.50 (matching rate with a refractive liquid: 96%).

Reference Example 2

After the first spinnable silica sol solution was prepared in a similar manner to that of Example 5, the procedure described in Example 5 was repeated, except that a diluted spinnable mixed sol solution prepared by mixing the first spinnable silica sol solution, polyvinylpyrrolidone, and N,N-dimethylformamide at a mass ratio of 3:1:16 (the solid content of the inorganic oxide of the first spinnable silica sol solution:polyvinylpyrrolidone:N,N-dimethylformamide) was spun, to obtain silica nanofibers having an average fiber diameter of 200 nm, an average fiber length of 20 m, a CV value of the fiber length of 0.164, an aspect ratio of 100, and a refractive index of 1.46.

<Measurement of Transmittance 1>

The mixed nanofibers prepared in Examples 5 and 7 and Reference Example 1, or the silica nanofibers prepared in Reference Example 2 were separately mixed with a polyacrylonitrile solution (manufactured by SIGMA-ALDRICH, average molecular weight: 150,000, solid content concentration: 15%, solvent: N,N-dimethylformamide), and stirred for 10 minutes using a deaerator (rotation speed: 2000 rpm). Each suspension was applied on a flat glass plate using a bar coater to form a film, and dried at a temperature of 80° C. for 90 minutes, to prepare composite sheets (mixed nanofiber content: 10% of the solid content of the polyacrylonitrile resin). The transmittance of an incident light at a wavelength of 500 nm for these composite sheets was measured using a spectrophotometer (UV-VIS). The results were shown in Table 2. [0139]

The transmittance for a polyacrylonitrile resin sheet (PAN resin sheet, manufactured by SIGMA-ALDRICH, average molecular weight: 150,000) prepared by not mixing any mixed nanofibers therewith was 91%.

As a reference, the result of a composite sheet prepared by mixing the polyacrylonitrile solution with 10 mass % of silica particles (registered trademark: Admafine, manufactured by Admatechs Company Limited, average particle diameter: 250 nm), thereby forming a film, is shown in Table 2, as <Reference Example 3>.

TABLE 2

|  | Transmittance (%) |
| --- | --- |
| PAN resin sheet | 91 |
| Example 5 | 85 |
| Example 7 | 87 |
| Reference Example 1 | 75 |
| Reference Example 2 | 70 |
| Reference Example 3 | 73 |

<Measurement of Transmittance 2>

The mixed nanofibers prepared in Example 6 were mixed with a transparent polyimide solution (solid concentration: 10%, solvent: N,N-dimethylformamide), and stirred for 10 minutes using a deaerator (rotation speed: 2000 rpm). The suspension was applied on a flat glass plate using a bar coater to form a film, and dried at a temperature of 80° C. for 90 minutes, followed by 270° C. for 30 minutes, to prepare a composite sheet (mixed nanofiber content: 10% of the solid content of the transparent polyimide resin). The transmittance of an incident light at a wavelength of 500 nm for the composite sheet was measured using a spectrophotometer (UV-VIS).

As a result of this measurement, the transmittance in the composite sheet was 82%. In connection with this, the transmittance for a polyimide resin sheet prepared by not mixing the mixed nanofiber therewith was 89%.

It was found, from the transmittance measurements 1 and 2 as described above, that inorganic mixed nanofibers having a desired refractive index could be prepared by the method of manufacturing an inorganic mixed nanofiber of the present invention, and therefore, when the inorganic mixed nanofibers were composited with a transparent resin, it would not impair the transparency that the transparent resin originally had.

<Measurement of Average Linear Expansion Coefficient>

The mixed nanofibers (average fiber diameter: 1 km) of Example 5, the mixed nanofibers (average fiber diameter: 200 nm) of Example 7, silica particle A (registered trademark: Admafine, manufactured by Admatechs Company Limited, average particle diameter: 250 nm), and silica particle B (registered trademark: Admafine, manufactured by Admatechs Company Limited, average particle diameter: 1 μm) were separately mixed with a polyacrylonitrile solution (manufactured by SIGMA-ALDRICH, average molecular weight: 150,000, solid content concentration: 15%, solvent: N,N-dimethylformamide) so that the solid content became 5 mass % or 10 mass %, and stirred for 10 minutes using a deaerator (rotation speed: 2000 rpm). Each suspension was applied on a flat glass plate using a bar coater to form a film, and dried at a temperature of 80° C. for 90 minutes, to prepare composite sheets A to H, as shown in Table 3.

TABLE 3

| Unit | Filler | (a) mass % | (b) ×10$^{-6}$(1/K) | (c) (%) |
| --- | --- | --- | --- | --- |
| PAN resin sheet | — | — | 121 | — |
| Composite sheet A | Example 5 | 5 | 69 | 43 |
| Composite sheet B | Example 5 | 10 | 49 | 59.5 |
| Composite sheet C | Example 7 | 5 | 91 | 24.8 |
| Composite sheet D | Example 7 | 10 | 70 | 42.1 |
| Composite sheet E | Silica particle A | 5 | 100 | 17.4 |
| Composite sheet F | Silica particle A | 10 | 87.5 | 27.7 |

TABLE 3-continued

| Unit | Filler | (a) mass % | (b) ×10⁻⁶(1/K) | (c) (%) |
|---|---|---|---|---|
| Composite sheet G | Silica particle B | 5 | 98.8 | 18.3 |
| Composite sheet H | Silica particle B | 10 | 107 | 11.6 |

(a): Solid content
(b): Average linear expansion coefficient
(c): Rate of decrease The average linear expansion coefficient of composite sheets A to H was measured in accordance with the TMA method prescribed in JIS K 7197 under the following conditions. In connection with this, the average linear expansion coefficient of a polyacrylonitrile resin sheet (PAN resin sheet, manufactured by SIGMA-ALDRICH, average molecular weight: 150,000) prepared by not mixing the polyacrylonitrile solution with any mixed nanofibers or silica particles was also measured. These results are shown in Table 3.

Measurement conditions: 30° C. to 100° C.
Rate of temperature increase: 5° C./min.
Sample size: film thickness 20 μm, width 5 mm, and length 10 mm It was found, from the measurement of the average linear expansion coefficient as described above, that when inorganic mixed nanofibers prepared by the method of manufacturing an inorganic mixed nanofiber of the present invention were composited with a transparent resin, the average linear expansion coefficient of the transparent resin could be reduced, and the thermal properties of the transparent resin could be improved.

<Measurement of Tensile Strength>

The mixed nanofibers (average fiber diameter: 1 μm) of Example 6, or silica particles (registered trademark: Admafine, manufactured by Admatechs Company Limited, average particle diameter: 1 μm) were mixed with a polyimide solution (solid content concentration: 10%, solvent: N,N-dimethylformamide) so that the solid content became 5 mass % or 10 mass %, and stirred for 10 minutes using a deaerator (rotation speed: 2000 rpm). Each suspension was applied on a flat glass plate using a bar coater to form a film, and dried at a temperature of 80° C. for 90 minutes followed by 270° C. for 30 minutes, to prepare composite sheets I to L, as shown in Table 4.

TABLE 4

| Sample Unit | Filler | (a) mass % | (b) N | (c) (%) |
|---|---|---|---|---|
| PI sheet | — | — | 5.5 | — |
| Composite sheet I | Example 6 | 5 | 7.1 | 29 |
| Composite sheet J | Example 6 | 10 | 7.7 | 40 |
| Composite sheet K | Silica particle | 5 | 4.3 | −22 |
| Composite sheet L | Silica particle | 10 | 5.5 | 0 |

(a): Solid content
(b): Maximum load until the sample was broken
(c): Rate of increase against maximum load of PI sheet The tensile strength of composite sheets I to L was measured using a tensile testing machine (manufactured by Orientec Co., Ltd., UCT-100) under the following conditions. In connection with this, the tensile strength of a transparent polyimide resin sheet (PI sheet) prepared by not mixing the polyimide solution with the mixed nanofibers or the silica particles. These results are shown in Table 4.

(Measurement Conditions)
Distance between chucks: 5 cm
Tensile speed: 50 mm/min.
(Sample Size)
Width 5 mm, length 7 cm, and thickness 20 μm It was found, from the measurement of the tensile strength as described above, that when inorganic mixed nanofibers prepared by the method of manufacturing an inorganic mixed nanofiber of the present invention were composited with a transparent resin, the tensile strength of the transparent resin could be increased, and the mechanical strength of the transparent resin could be improved.

(Preparation of Silica Fillers A)

Tetraethyl orthosilicate, water, hydrochloric acid, and ethanol were mixed at a molar ratio of 1:2:0.0025:5, and the mixture was heated and stirred at a temperature of 80° C. for 15 hours to carry out polycondensation. The reaction mixture was concentrated using an evaporator until the silica concentration became 44 mass %, and was thickened until the viscosity became 200 to 300 mPa·s, to obtain a silica sol solution.

Next, spinning was carried out using the spinnable silica sol solution, and an electrospinning apparatus as shown in FIG. 3, under the electrospinning conditions as shown in Table 5, and sintering was carried out under the sintering conditions as shown in Table 5, to obtain silica nanofiber sheet A consisting of silica nanofibers A having an average fiber diameter of 1 m.

Next, a plurality of silica nanofiber sheet A pieces having a mass of approximately 1 g were taken from the silica nanofiber sheet A, and the silica nanofiber sheet A pieces were stacked so that the thickness became 1.5 cm. The stacked sheets were pressed and crushed using a press machine at a pressure of 20 MPa for 3 seconds, to prepare silica fillers A having the properties as shown in Table 6.

TABLE 5

| | Spinning conditions | | | | Sintering conditions in sintering |
|---|---|---|---|---|---|
| Unit | #1 g/hr. | #2 cm | #3 ° C./% RH | #4 kV | furnace ° C./hr. |
| Silica filler A | 1 | 10 | 25/30 | +10 | 800/2 |
| Zirconia filler | 1 | 10 | 25/30 | +10 | 800/2 |
| Alumina filler A | 0.5 | 10 | 25/30 | +10 | 1200/2 |
| Silica filler B | 0.5 | 10 | 25/30 | +10 | 800/2 |
| Alumina filler B | 0.5 | 10 | 25/30 | +10 | 1200/2 |
| Titania filler A | 0.5 | 10 | 25/30 | +10 | — |
| Titania filler B | 0.5 | 10 | 25/30 | +10 | 600/2 |

1: Amount extruded (Amount extruded from nozzle)
2: Distance (Distance between nozzle tip and drum support)
3: Temperature and humidity (Temperature and humidity in spinning box)
4: Voltage applied (Voltage applied to nozzle)

(Preparation of Zirconia Fillers)

Zirconium tetra-n-butoxide [Zr(OnBu)₄], ethyl acetoacetate, hydroxylammonium chloride, water, 2-propanol, and yttrium nitrate hexahydrate were mixed at a molar ratio of 1:2:0.025:2:22:0.033, and the mixture was stirred at room temperature for 15 hours to carry out polycondensation. The reaction mixture was concentrated using an evaporator until the zirconium concentration became 30 mass %, and was thickened until the viscosity became 2100 to 2800 mPa·s, to obtain a spinnable zirconia sol solution. In this case, Zr(OnBu)₄ functions as an inorganic material, ethyl acetoacetate functions as a ligand, and hydroxylammonium chloride functions as a catalyst.

Next, spinning was carried out using the spinnable zirconia sol solution, and an electrospinning apparatus as shown in FIG. 3, under the electrospinning conditions as shown having Table 5, and sintering was carried out under the sintering conditions as shown in Table 5, to obtain a zirconia nanofiber sheet consisting of silica nanofibers having an average fiber diameter of 0.3 µm.

Next, a plurality of zirconia nanofiber sheet pieces having a mass of approximately 1 g were taken from the zirconia nanofiber sheet, and the zirconia nanofiber sheet pieces were stacked so that the thickness became 1.5 cm. The stacked sheets were pressed and crushed using a press machine at a pressure of 40 MPa for 3 seconds, to prepare zirconia fillers having the properties as shown in Table 6.

(Preparation of Alumina Fillers A)

Aluminum sec-butoxide, ethyl lactate, tetrabutylammonium hydroxide, water, and 2-propanol were mixed at a molar ratio of 1:5:0.0025:1:5, and the mixture was stirred at a temperature of 70° C. for 15 hours to carry out polycondensation. The reaction mixture was concentrated using an evaporator until the alumina concentration became 30 mass %, and was thickened until the viscosity became 2000 to 3000 mPa·s, to obtain a spinnable alumina sol solution.

Next, spinning was carried out using the spinnable alumina sol solution, and an electrospinning apparatus as shown in FIG. 3, under the electrospinning conditions as shown in Table 5, and sintering was carried out under the sintering conditions as shown in Table 5, to obtain alumina nanofiber sheet A consisting of alumina nanofibers A having an average fiber diameter of 0.7 µm.

Next, a plurality of alumina nanofiber sheet A pieces having a mass of approximately 1 g were taken from the alumina nanofiber sheet A, and the alumina nanofiber sheet A pieces were stacked so that the thickness became 1.5 cm. The stacked sheets were pressed and crushed using a press machine at a pressure of 20 MPa for 3 seconds, to prepare alumina fillers A having the properties as shown in Table 6.

(Preparation of Silica Fillers B)

Since silica particles (manufactured by Fuso Chemical Co., Ltd., product name: PL-3, particle diameter: 30 nm) were not spinnable, the silica particles were dispersed in a polyvinyl alcohol solution (average polymerization degree: 1000, solid concentration: 10 mass %, solvent: water) so that the solid mass ratio of silica particles:polyvinyl alcohol became 3:7, to prepare a spinning solution.

Next, spinning was carried out using an electrospinning apparatus as shown in FIG. 3, under the electrospinning conditions as shown in Table 5, and sintering was carried out under the sintering conditions as shown in Table 5, to obtain silica nanofiber sheet B consisting of silica nanofibers B having an average fiber diameter of 1 µm.

Next, a plurality of silica nanofiber sheet B pieces having a mass of approximately 1 g were taken from the silica nanofiber sheet B, and the silica nanofiber sheet B pieces were stacked so that the thickness became 1.5 cm. The stacked sheets were pressed and crushed using a press machine at a pressure of 10 MPa for 3 seconds, to prepare silica fillers B having the properties as shown in Table 6.

(Preparation of Alumina Fillers B) Since alumina particles (Kawaken Fine Chemicals Co., Ltd., product name: Alumina Sol-10A, average particle size: 100 nm) were not spinnable, the alumina particles were dispersed in a polyvinyl alcohol solution (average polymerization degree: 1000, solid concentration: 10 mass %, solvent: water) so that the solid mass ratio of alumina particles:polyvinyl alcohol became 3:7, to prepare a spinning solution.

Next, spinning was carried out using an electrospinning apparatus as shown in FIG. 3, under the electrospinning conditions as shown in Table 5, and sintering was carried out under the sintering conditions as shown in Table 5, to obtain alumina nanofiber sheet B consisting of alumina nanofibers B having an average fiber diameter of 1 m.

Next, a plurality of alumina nanofiber sheet B pieces having a mass of approximately 1 g were taken from the alumina nanofiber sheet B, and the alumina nanofiber sheet B pieces were stacked so that the thickness became 1.5 cm. The stacked sheets were pressed and crushed using a press machine at a pressure of 10 MPa for 3 seconds, to prepare alumina fillers B having the properties as shown in Table 6.

(Preparation of Titania Fillers A)

To 1 part by mass of titanium tetra-n-butoxide (manufactured by Wako Pure Chemical Industries, Ltd., first grade), 1.3 parts by mass of acetic acid (manufactured by Wako Pure Chemical Industries, Ltd., special grade) was added and mixed to prepare uniform solution S1. To 1 part by mass of ion-exchanged water, 0.016 part by mass of polyethylene oxide (manufactured by Wako Pure Chemical Industries, Ltd., first grade, average molecular weight: 300,000 to 500,000) was mixed to prepare solution S2.

Next, while the solution S2 was stirred and added to the solution S1, a gel was generated in the solution. After stirring was continued, the generated gel was dissociated to become transparent solution S3, and solution S3 was used as a spinning solution hereinafter.

Next, electrospinning was attempted using an electrospinning apparatus as shown in FIG. 3 under the conditions as shown in Table 5, but no fibers were obtained.

(Preparation of Titania Fillers B)

To 1 part by mass of titanium tetra-n-butoxide (manufactured by Wako Pure Chemical Industries, Ltd., first grade), 1.3 parts by mass of acetic acid (manufactured by Wako Pure Chemical Industries, Ltd., special grade) was added and mixed to prepare uniform solution S4. To solution S4, while a solution mixed with 1 part by mass of ion-exchanged water was stirred and added, a gel was generated in the solution. After stirring was continued, the generated gel was dissociated to obtain transparent solution S5.

Next, solution S5 and a polyvinylpyrrolidone solution (average molecular weight: 630,000, solid content concentration: 20 mass %, solvent: N,N-dimethylformamide) were mixed at a mass ratio of 3:2 to prepare a spinning solution.

Next, electrospinning was carried out using an electrospinning apparatus as shown in FIG. 3 under the conditions as shown in Table 5, and sintering was carried out under the sintering conditions as shown in Table 5, to obtain a titania nanofiber sheet consisting of titania nanofibers having an average fiber diameter of 0.5 m.

Next, a plurality of titania nanofiber sheet pieces having a mass of approximately 1 g were taken from the titania nanofiber sheet, and the titania nanofiber sheet pieces were stacked so that the thickness became 1.5 cm. The stacked sheets were pressed and crushed using a press machine at a pressure of 10 MPa for 3 seconds, to prepare titania fillers B having the properties as shown in Table 6.

TABLE 6

| Unit | (a) (µm) | (b) (µm) | (c) | (d) | (e) (%) |
|---|---|---|---|---|---|
| Silica filler A | 1 | 79.2 | 79.2 | 0.098 | 3.5 |
| Zirconia filler | 0.3 | 40 | 133 | 0.141 | 0.8 |
| Alumina filler A | 0.7 | 48.7 | 69.6 | 0.125 | 10.3 |

TABLE 6-continued

| Unit | (a) (μm) | (b) (μm) | (c) | (d) | (e) (%) |
|---|---|---|---|---|---|
| Silica filler B | 1 | 110 | 110 | 0.422 | 39.1 |
| Alumina filler B | 1 | 85.2 | 85.2 | 0.476 | 40.7 |
| Titania filler B | 0.5 | 58.5 | 117 | 0.428 | 31.8 |

(a): Average fiber diameter
(b): Average fiber length
(c): Aspect ratio
(d): CV value of the fiber length
(e): Rate of change in fiber length (Examples 8 to 10 and Reference Examples 4 to 7) Each inorganic filler prepared in the above-mentioned procedures were separately mixed with a polyimide solution (solid concentration: 10 mass %, solvent: N,N-dimethylformamide) so that the percentage of the inorganic filler in a filler-dispersed polyimide film as a final product became 9 mass %, and stirred for 10 minutes using a deaerator (rotation speed: 2000 rpm). Each suspension was applied on a flat glass plate using a bar coater to form a film, and dried at a temperature of 80° C. for 180 minutes, to prepare filler-dispersed polyimide films.

These filler-dispersed polyimide films were used to carry out a tensile test and a linear expansion coefficient measurement in accordance with the following methods. The results are shown in Table 7. In connection with this, a polyimide film in which no inorganic fillers were mixed was prepared in a similar manner, and the properties thereof are shown in Table 7 as Reference Example 7.

(Tensile Test)

A constant-rate, extension type tensile testing machine (manufactured by Orientec Co., Ltd., UCT-100) was used to measure a maximum load until the sample was broken under the following conditions. The maximum load was measured using 5 samples, and the arithmetic mean value of these measured values was regarded as tensile strength.

(Measurement Conditions)
Distance between chucks: 5 cm
Tensile speed: 50 mm/min.
Sample size: width 5 mm and length 7 cm (Measurement of Average Linear Expansion Coefficient)

The measurement was carried out in accordance with the TMA method prescribed in JIS K 7197 under the following conditions.

(Measurement Conditions)
Temperature range: 30° C. to 80° C.
Rate of temperature increase: 5° C./min.
Sample size: width 5 mm and length 10 mm

TABLE 7

| Unit | Filler | film thickness (μm) | #1 (N) | #2 [×10$^{-6}$(1/K)] |
|---|---|---|---|---|
| Referential Example 7 | Not added | 20 | 5.5 | 34.3 |
| Example 8 | Silica filler A | 20 | 7.1 (29%) | 15.9 (54%) |
| Example 9 | Zirconia filler | 20 | 7.4 (35%) | 30.1 (12%) |
| Example 10 | Alumina filler A | 20 | 7.7 (40%) | 28.0 (18%) |
| Referential Example 4 | Silica filler B | 20 | 3.9 (−29%) | 29.6 (14%) |
| Referential Example 5 | Alumina filler B | 20 | 6.5 (18%) | 31.2 (9%) |
| Referential Example 6 | Titania filler B | 20 | 6.6 (20%) | 31.3 (9%) |

1: Tensile strength (value in parentheses; Rate of increase against tensile strength of Referential Example 7 (polyimide film))
2: Average linear expansion coefficient (value in parentheses: Rate of decrease against average linear expansion coefficient of Referential Example 7 (polyimide film))

Example 11 and Reference Example 8

The silica fillers A prepared in the above-mentioned procedure were mixed with a polyacrylonitrile solution (manufactured by SIGMA-ALDRICH, average molecular weight: 150,000, solid content concentration: 15 mass %, solvent: N,N-dimethylformamide) so that the percentage of the silica filler A in a silica-filler-A-dispersed polyacrylonitrile film as a final product became 9 mass %, and stirred for 10 minutes using a deaerator (rotation speed: 2000 rpm). The suspension was applied on a flat glass plate using a bar coater to form a film, and dried at a temperature of 80° C. for 180 minutes, to prepare a silica-filler-A-dispersed polyacrylonitrile film.

The silica-filler-A-dispersed polyacrylonitrile film was used to carry out a tensile test and a linear expansion coefficient measurement in a manner similar to those of Example 8. The results are shown in Table 8. In connection with this, a polyacrylonitrile film in which silica fillers A were not mixed was prepared in a similar manner, and the properties thereof are shown in Table 8 as Reference Example 8.

TABLE 8

| Unit | film thickness (μm) | #1 (N) | #2 [×10$^{-6}$(1/K)] |
|---|---|---|---|
| Referential Example 8 | 20 | 6.4 | 87.3 |
| Example 11 | 20 | 7 (9%) | 42.4 (51%) |

1: Tensile strength (value in parentheses: Rate of increase against tensile strength of Referential Example 8 (polyacrylonitrile film))
2: Average linear expansion coefficient (value in parentheses: Rate of decrease against average linear expansion coefficient of Referential Example 8 (polyacrylonitrile film))

Example 12 and Reference Example 9

The silica fillers A prepared in the above-mentioned procedure were mixed with a polyvinylidene fluoride solution (solid content concentration: 10 mass %, solvent: N,N-dimethylformamide) so that the percentage of the silica filler A in a silica-filler-A-dispersed polyvinylidene fluoride film as a final product became 9 mass %, and stirred for 10 minutes using a deaerator (rotation speed: 2000 rpm). The suspension was applied on a flat glass plate using a bar coater to form a film, and dried at a temperature of 80° C. for 180 minutes, to prepare a silica-filler-A-dispersed polyvinylidene fluoride film.

The silica-filler-A-dispersed polyvinylidene fluoride film was used to carry out a tensile test and a linear expansion coefficient measurement in a manner similar to those of Example 8. The results are shown in Table 9. In connection with this, a polyvinylidene fluoride film in which silica fillers A were not mixed was prepared in a similar manner, and the properties thereof are shown in Table 9 as Reference Example 9.

TABLE 9

| Unit | film thickness (μm) | #1 (N) | #2 [×10⁻⁶(1/K)] |
|---|---|---|---|
| Referential Example 9 | 20 | 2 | 187 |
| Example 12 | 20 | 2.2 (10%) | 54.3 (71%) |

1: Tensile strength (value in parentheses: Rate of increase against tensile strength of Referential Example 9 (polyvinylidene fluoride film))
2: Average linear expansion coefficient (value in parentheses: Rate of decrease against average linear expansion coefficient of Referential Example 9 (polyvinylidene fluoride film))

<Preparation of Fibrous Alumina Fillers C>

An alumina nanofiber sheet consisting of alumina nanofibers having an average fiber diameter of 0.7 m was obtained in a similar manner to that of <Preparation of fibrous alumina fillers A>, except that the concentrating concentration in the preparation of a spinnable alumina sol solution was 15 mass %, and that the sintering in the sintering furnace was carried out at a temperature of 1600° C. for 2 hours.

Next, a plurality of alumina nanofiber sheet pieces having a mass of approximately 1 g were taken from the alumina nanofiber sheet, and the alumina nanofiber sheet pieces were stacked so that the thickness became 1.5 cm. The stacked sheets were pressed and crushed using a press machine at a pressure of 50 MPa for 3 seconds, to prepare fibrous alumina fillers C having the properties as shown in Table 10.

<Preparation of Fibrous Alumina Fillers D>

Approximately 1 g by mass of alumina fibers (registered trademark: DENKA ALCEN bulk, Grade: B-100, manufactured by DENKA KAGAKU KOGYO KABUSHIKI KAISHA) were weighed out, and the thickness was adjusted to 1.5 cm. The alumina fibers were pressed and crushed using a press machine at a pressure of 10 MPa for 3 seconds, to prepare fibrous alumina fillers D having the properties as shown in Table 10.

<Preparation of Fibrous Alumina Fillers E>

An alumina nanofiber sheet prepared in a similar manner to that of the fibrous alumina fillers C was crushed using an automatic mortar. That is, approximately 1 g of the alumina nanofiber sheet was weighed out, and an appropriate amount of water was added to the automatic mortar. The sheet was crushed using the automatic mortar for 2 hours, to prepare fibrous alumina fillers E having the properties as shown in Table 10.

<Preparation of Alumina Powder>

α-Alumina powder (product number: RA-30, average particle size: 1 μm, manufactured by Iwatani Chemical Industry Co., Ltd.) was prepared as alumina powder.

TABLE 10

| Unit | (a) (μm) | (b) (μm) | (c) | (d) | (e) (%) |
|---|---|---|---|---|---|
| Alumina filler C | 0.7 | 48.7 | 69.6 | 0.125 | 10.3 |
| Alumina filler D | 3 | 107 | 36 | 0.491 | 35.5 |
| Alumina filler E | 0.7 | 37 | 52.9 | 1.17 | 37 |

(a): Average fiber diameter
(b): Average fiber length
(c): Aspect ratio
(d): CV value of the fiber length
(e): Rate of change in fiber length (Preparation of Filler-Dispersed Polyimide Film)

Alumina fillers C to E or powder prepared in the above-mentioned procedures were separately mixed with a polyimide solution (solid concentration: 10 mass %, solvent: N,N-dimethylformamide) so that the percentage of the alumina filler or powder in a filler-dispersed polyimide film as a final product became 10 mass %, and stirred for 10 minutes using a deaerator (rotation speed: 2000 rpm). Each suspension was applied on a flat glass plate using a bar coater to form a film, and dried at a temperature of 80° C. for 180 minutes followed by 180° C. for 60 minutes, to prepare an alumina-filler-C-dispersed polyimide film (Experimental Example 1), an alumina-filler-D-dispersed polyimide film (Experimental Example 2), an alumina-filler-E-dispersed polyimide film (Experimental Example 3), and an alumina-powder-dispersed polyimide film (Experimental Example 4).

These films of Experimental Examples 1 to 4 were used to carry out a tensile test and a linear expansion coefficient measurement in a manner similar to those of Examples 8 to 10. The results are shown in Table 11. In connection with this, a polyimide film in which no inorganic fillers were mixed was prepared in a similar manner, and the properties thereof are shown in Table 11 as Experimental Example 5.

TABLE 11

| Unit | film thickness (μm) | #1 (N) | #2 [×10⁻⁶(1/K)] |
|---|---|---|---|
| Exp. Example 1 | 30 | 15.7 (8%) | 3.5 (87%) |
| Exp. Example 2 | 30 | 11.8 (−19%) | 12.3 (56%) |
| Exp. Example 3 | 30 | 11.6 (−20%) | 17.3 (38%) |
| Exp. Example 4 | 30 | 14.3 (−1.4%) | 20.1 (27%) |
| Exp. Example 5 | 30 | 14.5 | 17.7 |

1: Tensile strength (value in parentheses: Rate of increase against tensile strength of Experimental Example 5)
2: Average linear expansion coefficient (value in parentheses; Rate of decrease against average linear expansion coefficient of Experimental Example 5)

It was found, from the comparison of Experimental Example 1 with Experimental Examples 2 and 3 in Table 11, when fibrous fillers in which the rate of change in fiber length was low were used, the tensile strength of the filler-dispersed polyimide film could be further enhanced.

Further, it was found, from the comparison of Experimental Example 1 with Experimental Example 4, that when fibrous fillers were used, the tensile strength of the filler-dispersed polyimide film could be further enhanced.

Examples 13 to 14 and Reference Examples 10 to 14

The fibrous alumina fillers C, the fibrous alumina fillers D, the fibrous alumina fillers E, or the alumina powder were separately mixed with a polyimide solution (solid concentration: 10 mass %, solvent: N,N-dimethylformamide) so that the percentage of the filler in a fibrous-alumina-filler-dispersed polyimide film as a final product became the values as shown in Table 12, and stirred for 10 minutes using a deaerator (rotation speed: 2000 rpm). Next, 5 g of each suspension was poured in a petri dish to form a film, and dried under vacuum at 80° C. for 300 minutes, to prepare alumina-filler-dispersed polyimide films. Further, 5 g of a polyimide solution (solid concentration: 10 mass %, solvent:

N,N-dimethylformamide) was poured in a petri dish to form a film, and dried under vacuum at 80° C. for 300 minutes, to prepare a polyimide film.

TABLE 12

| Unit | Filler | (a) mass % | (b) g/m² | (C) μm | (d) W/m·K |
|---|---|---|---|---|---|
| Polyimide resin sheet | — | — | 420 | 300 | 0.24 |
| Example 13 | Alumina C | 10 | 501 | 300 | 3.398 |
| Example 14 | Alumina C | 12 | 521 | 100 | 4.889 |
| Referential Example 10 | Alumina D | 10 | 501 | 300 | 1.703 |
| Referential Example 11 | Alumina D | 12 | 521 | 300 | 1.788 |
| Referential Example 12 | Alumina E | 15 | 542 | 300 | 1.669 |
| Referential Example 13 | Alumina powder | 10 | 501 | 300 | 1.564 |
| Referential Example 14 | Alumina powder | 12.5 | 521 | 300 | 2.682 |

(a): Solid content
(b): Mass per unit area
(e): Thickness
(d): Thermal conductivity (Measurement of Thermal Conductivity)

The alumina-filler-dispersed polyimide films of Examples 13 to 14 and Reference Examples 10 to 14 were used to measure the thermal conductivity. Test pieces (length 10 mm, width 10 mm, and thickness 0.3 mm) were taken from the alumina-filler-dispersed polyimide films, and the thermal conductivity in the thickness direction was measured in accordance with the above-mentioned method. The results are shown in Table 12.

As shown in Table 12, the filler-dispersed organic resin composites in which fibrous alumina fillers were dispersed in the organic resin exhibited a good thermal conductivity of 3 W/m·K or more at a thickness of 0.3 mm.

It was found, from the comparison of Example 13 with Reference Example 10, and the comparison of Example 14 with Reference Example 11, that when the rate of change in fiber length of fibrous alumina fillers was 30% or less, the thermal conductivity was remarkably improved. The reason was considered that the mechanical strength of the fibrous alumina fillers was good, and it was not easily destroyed during film formation, and therefore, percolation could be secured.

It was found, from the comparison of Examples 13 and 14 with Reference Example 12, that when the CV value of the fiber length was 0.7 or less, the thermal conductivity was remarkably improved. The reason was considered that the fiber length was uniform, and therefore, percolation could be secured.

It was found, from the comparison of Examples 13 and 14 with Reference Examples 13 and 14, that when the fillers were fibrous, the thermal conductivity was remarkably improved. The reason was considered that thermal conduction could be carried out continuously to some extent, and therefore, percolation could be secured.

INDUSTRIAL APPLICABILITY

The inorganic nanofiber of the present invention is an inorganic nanofiber, in which the average fiber diameter is 2 μm or less, which is thin, and despite the fact that the average fiber length is 200 μm or less, which could not be obtained by a conventional cutting machine, the CV value of the fiber length is 0.7 or less, i.e., the fiber length is uniform. Therefore, a composite having thin and uniform properties can be formed. For example, even when the inorganic nanofiber is used as a filler for a thin-film polymer film, since it is unlikely to protrude from the surface of the polymer film, it is easy to produce a polymer film composite which is practically problem-free. Further, it may be suitably used as materials which constitute, for example, a catalyst carrier, a structural material, an electrode material, a filter material, or the like.

Further, since the inorganic nanofiber of the present invention exhibits a good mechanical strength, and the composite in which the inorganic nanofibers are composited exhibits a good mechanical strength and a good form stability against a temperature change, it may be suitably used in applications, such as a display, a solar cell substrate, a surface protection film, an interlayer insulating film, or the like. In particular, since the composite in which alumina nanofibers are composited exhibits a good thermal conductivity, it may be suitably used in applications requiring thermal conductivity, for example, semiconductor device applications, thermal printer applications, adhesive applications, solar cell applications, or the like.

Furthermore, since inorganic mixed nanofibers having a desired refractive index may be prepared by the method of manufacturing an inorganic mixed nanofiber of the present invention, the mechanical strength and thermal properties of a transparent resin sheet can be improved without impairing the transparency of the transparent resin sheet, by using the inorganic mixed nanofibers prepared by the manufacturing method of the present invention as a filler.

Although the present invention has been described with reference to specific embodiments, various changes and modifications obvious to those skilled in the art are possible without departing from the scope of the appended claims.

REFERENCE SIGNS LIST

1. Means for supplying a spinning solution
2. Nozzle
3. Support
4. Means for applying a voltage
5. Space for spinning
6. Spinning box
7. Means for supplying a gas
8. Means of exhaust
a1 to a3, b1 to b5, c1 to c6, d1 to d6, e1 to e5: Inter-sections of fibers
A1 to A3, B1 to B5, C1 to C7, D1 to D6, E1 to E5: Inter-sections of fibers

The invention claimed is:

1. A method of manufacturing an inorganic mixed nanofiber, comprising:
    mixing a first spinnable sol solution, which is a material for a first inorganic oxide, with a second spinnable sol solution or a metal salt solution, which is a material for a second inorganic oxide having a refractive index different from that of the first inorganic oxide, to prepare a spinnable mixed sol solution,
    forming an inorganic mixed nanofiber sheet consisting of inorganic mixed nanofibers having an average fiber diameter of 2 μm or less from the spinnable mixed sol solution by electrospinning, and
    pressing the inorganic mixed nanofiber sheet using a press machine, and crushing it so that the average fiber length becomes 200 μm or less, and the CV value of the fiber length becomes 0.7 or less, wherein a potential hydrogen of the first spinnable sol solution is matched with that of the second spinnable sol solution or the metal salt solution, and the preparation of the spinnable mixed sol solution is carried out without being gelled.

\* \* \* \* \*